United States Patent
Matsuura et al.

(10) Patent No.: US 11,135,755 B2
(45) Date of Patent: Oct. 5, 2021

(54) LAMINATE, MOLDED ARTICLE IN WHICH LAMINATE IS USED, AND METHOD FOR MANUFACTURING SAME

(71) Applicant: IDEMITSU UNITECH CO., LTD., Tokyo (JP)

(72) Inventors: Tatsuro Matsuura, Chiba (JP); Kaname Kondo, Chiba (JP); Keishi Tada, Tokyo (JP)

(73) Assignee: IDEMITSU UNITECH CO., LTD., Tokyo (JP)

(*) Notice: Subject to any disclaimer, the term of this patent is extended or adjusted under 35 U.S.C. 154(b) by 277 days.

(21) Appl. No.: 16/071,743

(22) PCT Filed: Jan. 20, 2017

(86) PCT No.: PCT/JP2017/001948
§ 371 (c)(1),
(2) Date: Jul. 20, 2018

(87) PCT Pub. No.: WO2017/126663
PCT Pub. Date: Jul. 27, 2017

(65) Prior Publication Data
US 2019/0022911 A1   Jan. 24, 2019

(30) Foreign Application Priority Data

Jan. 22, 2016   (JP) .................................. 2016-011083
Jan. 22, 2016   (JP) ............................. JP2016-011084

(51) Int. Cl.
*B32B 3/10*   (2006.01)
*B29C 48/00*   (2019.01)
(Continued)

(52) U.S. Cl.
CPC .... *B29C 48/0011* (2019.02); *B29C 45/14811* (2013.01); *B29C 48/0017* (2019.02);
(Continued)

(58) Field of Classification Search
None
See application file for complete search history.

(56) References Cited

U.S. PATENT DOCUMENTS 5,972,519 A * 10/1999 Niessner .................... C08J 5/18
428/474.4
2008/0131638 A1   6/2008 Hutton et al.
2009/0104441 A1   4/2009 Sawada et al.

FOREIGN PATENT DOCUMENTS

CN   101124087 A   2/2008
CN   101845162 A   9/2010
(Continued)

OTHER PUBLICATIONS

Machine translation of JP-2015027880-A (Year: 2015).*
(Continued)

*Primary Examiner* — Christopher M Polley
(74) *Attorney, Agent, or Firm* — Millen White Zelano & Branigan; Ryan Pool

(57) ABSTRACT

A method of manufacturing a molded article, which comprises:
(a) a step of manufacturing the molded article by use of a laminate that has a first layer comprising polypropylene, and a second layer comprising one or more selected from the group consisting of polyethylene, polyamide, an ethylene-vinyl alcohol copolymer, and an ethylene-vinyl acetate copolymer.

51 Claims, 1 Drawing Sheet

(51) Int. Cl.
  *B29C 48/18* (2019.01)
  *B32B 27/32* (2006.01)
  *B29C 51/12* (2006.01)
  *B29C 51/14* (2006.01)
  *B29C 45/14* (2006.01)
  *B29C 48/21* (2019.01)
  *B29K 623/00* (2006.01)
  *B29C 48/08* (2019.01)
  *B29C 48/88* (2019.01)
  *B29C 43/48* (2006.01)
  *B32B 27/08* (2006.01)

(52) U.S. Cl.
  CPC ........ *B29C 48/0023* (2019.02); *B29C 48/022* (2019.02); *B29C 48/18* (2019.02); *B29C 48/21* (2019.02); *B29C 51/12* (2013.01); *B29C 51/14* (2013.01); *B32B 27/32* (2013.01); *B29C 48/08* (2019.02); *B29C 48/914* (2019.02); *B29C 2043/486* (2013.01); *B29K 2623/04* (2013.01); *B29K 2623/10* (2013.01); *B32B 27/08* (2013.01); *B32B 2307/538* (2013.01); *Y10T 428/2486* (2015.01)

(56) References Cited

FOREIGN PATENT DOCUMENTS

| JP | 2000108280 | A2 | | 4/2000 |
|---|---|---|---|---|
| JP | 200158374 | A | | 3/2001 |
| JP | 2003276135 | A | | 9/2003 |
| JP | 2006131275 | A | | 5/2006 |
| JP | 2007536114 | A | | 12/2007 |
| JP | 2012011732 | A | | 1/2012 |
| JP | 2013212843 | A | | 10/2013 |
| JP | 201527880 | A | | 2/2015 |
| JP | 2015027880 | A | * | 2/2015 |
| WO | 2006090786 | A1 | | 8/2006 |
| WO | 2014112389 | A1 | | 7/2014 |

OTHER PUBLICATIONS

Prime Polymer (Year: 2008).*
International Search Report for PCT/JP2017/001948 dated Apr. 11, 2017.
English Abstract of JP2001058374, Publication Date: Mar. 6, 2001.
English Abstract of JP2013212843, Publication Date: Oct. 17, 2013.
English Abstract of JP2015027880, Publication Date: Feb. 12, 2015.
English Abstract of WO2014112389, Publication Date: Jul. 24, 2014.
English Abstract of JP2012011732, Publication Date: Jan. 19, 2012.
Office Action dated Jan. 19, 2020 issued in corresponding Chinese Patent Appln. No. 201780007610.6 (pp. 1-9).
Office Action in corresponding JP Appl No. 2018-091688 dated Oct. 27, 2020 (pp. 1-5).

* cited by examiner

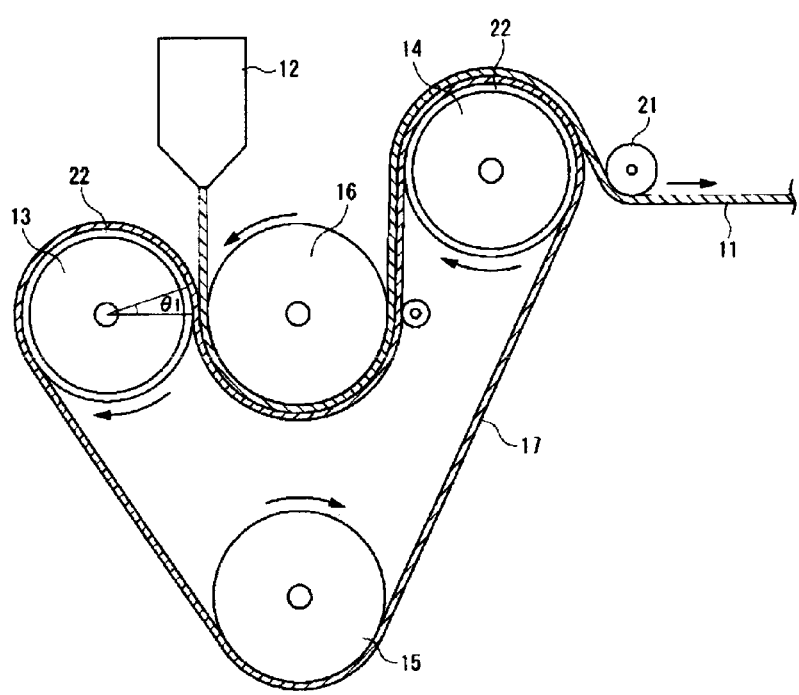

LAMINATE, MOLDED ARTICLE IN WHICH LAMINATE IS USED, AND METHOD FOR MANUFACTURING SAME

TECHNICAL FIELD

The present invention relates to a laminate, a molded article in which a laminate is used, and a method of manufacturing the same.

BACKGROUND ART

At present, there is developed a technique of integrating a so-called decorative sheet having a surface shape, printing, or the like thereon with a resin molded article, and providing the resin molded article with a design.

For example, Patent Document 1 discloses a peelable laminate in which a protective film made of a polyolefin resin is directly laminated on a mat film made of a thermoplastic resin other than a polyolefin resin.

On the other hand, a polypropylene sheet has satisfactory moldability and chemical resistance, and its application to a decorative sheet is under consideration.

However, a polypropylene sheet having satisfactory moldability and chemical resistance, particularly, a transparent polypropylene sheet needs to be cooled by sandwiching the molten polypropylene with a cooling roll, a stainless belt, or the like. If the thickness is reduced, it becomes difficult to discharge air and to mold molten polypropylene into a sheet shape. Therefore, the polypropylene sheet is not in practical use.

Further, a decorative sheet has a protective film attached to a polypropylene sheet so that a part to be the outermost surface of a molded article is not damaged during secondary processing such as cutting and printing. The protective film is cooled and solidified by extrusion molding, and then attached in-line or out-line. However, because the protective film is attached after cooled and solidified, there has been a problem that a defect which impairs appearance occurs due to damage caused by the contact of a guide roll or the adhesion of foreign objects.

In Patent Document 1, a polyethylene resin, a polypropylene resin, and modified polyolefin which is a modified product of the above are laminated on a thermoplastic resin layer of a polycarbonate resin or the like. However, the thermoplastic resin lower in contraction percentage than the polypropylene resin is laminated, and if the thickness of the layer of the polypropylene resin becomes larger than the thickness of the layer of the thermoplastic resin, the sheet is pulled and warped by the contraction of the polypropylene resin, resulting in a useless sheet.

RELATED ART DOCUMENT

Patent Document

[Patent Document 1] JP-A-2012-11732

SUMMARY OF INVENTION

An object of the present invention is to provide a novel laminate comprising a polypropylene sheet to decorate a molded article, a molded article using the laminate, and a method of manufacturing the same.

Another object of the present invention is to provide a laminate in which appearance of a molded article and handling at printing are satisfactory, a method of manufacturing the same, and a method of manufacturing a molded article.

According to the present invention, a laminate, a method of manufacturing a molded article, and others below are provided.

1. A method of manufacturing a molded article, which comprises:
   (a) a step of manufacturing the molded article by use of a laminate that has a first layer comprising polypropylene, and a second layer comprising one or more selected from the group consisting of polyethylene, polyamide, an ethylene-vinyl alcohol copolymer, and an ethylene-vinyl acetate copolymer.
2. The method of manufacturing the molded article according to 1, which further comprises:
   (b) a step of separating the second layer from the laminate.
3. A method of manufacturing a molded article, which comprises:
   (a) a step of manufacturing the molded article by use of a laminate that has a first layer comprising polypropylene, a second layer comprising one or more selected from the group consisting of polyethylene, polyamide, an ethylene-vinyl alcohol copolymer, and an ethylene-vinyl acetate copolymer, and a third layer comprising polypropylene.
4. The method of manufacturing the molded article according to 3, which further comprises:
   (b) a step of separating the second layer and the third layer from the laminate.
5. The method of manufacturing the molded article according to any one of 1 to 4, wherein in the step (a), the laminate is attached to a die, and a resin for molded articles is supplied to integrate the laminate with the resin for molded articles.
6. The method of manufacturing the molded article according to any one of 1 to 4, wherein in the step (a), the laminate is shaped in conformity to a die, the shaped laminate is attached to the die, and a resin for molded articles is supplied to integrate the laminate with the resin for molded articles.
7. The method of manufacturing the molded article according to any one of 1 to 4, wherein in the step (a),
   a core material is provided in a chamber box,
   the laminate is disposed above the core material,
   the inside of the chamber box is decompressed,
   the laminate is heated and softened, and
   the heated and softened laminate is pressed on the core material to cover the core material.
8. The method of manufacturing the molded article according to any one of 1 to 7, wherein the step (b) is conducted before or after the step (a).
9. The method of manufacturing the molded article according to any one of 1 to 8, which further comprises, before the step (a):
   (c) a step of forming a fourth layer comprising one or more selected from the group consisting of a urethane resin, an acrylic resin, polyolefin, and polyester on the surface of the first layer with which the second layer is not in contact.
10. The method of manufacturing the molded article according to 9, which further comprises, after the step (c):
    a step (d) of printing the surface of the fourth layer with which the first layer is not in contact,
    followed by conducting the step (a) or the step (b).
11. The method of manufacturing the molded article according to 9, which further comprises, after the step (d):

(e) a step of forming a layer comprising a metal or a metal oxide on the surface of the fourth layer with which the first layer is not in contact, followed by conducting the step (a) or the step (b).

12. The method of manufacturing the molded article according to any one of 1 to 11, wherein a thickness of the first layer is 60 μm to 250 μm.

13. The method of manufacturing the molded article according to any one of 1 to 12, wherein when the second layer is separated, an arithmetic average roughness Ra of the side of the first layer contacting the second layer is 0.50 μm or less.

14. A laminate comprising:
a first layer comprising polypropylene; and
a second layer comprising one or more selected from the group consisting of polyethylene, polyamide, an ethylene-vinyl alcohol copolymer, and ethylene-vinyl acetate copolymer, wherein a thickness of the first layer is 60 μm to 250 μm, and
the first layer and the second layer are in contact.

15. The laminate according to 14, having a thickness of 62 to 252 μm.

16. The laminate according to 14 or 15, which further comprises a third layer comprising polypropylene, wherein
the third layer is in contact with the surface of the second layer with which the first layer is not in contact.

17. The laminate according to any one of 14 to 16, which further comprises a fourth layer comprising one or more selected from the group consisting of a urethane resin, an acrylic resin, polyolefin, and polyester,
wherein the fourth layer is in contact with the surface of the first layer with which the second layer is not in contact.

18. The laminate according to 17, wherein the fourth layer is formed from a plurality of layers.

19. The laminate according to 17 or 18, wherein when a thickness of the fourth layer is 150 μm, a tensile elongation at break of this layer is 150% to 900%, and
a softening temperature of the fourth layer is 50° C. to 180° C.

20. The laminate according to any one of 17 to 20, wherein the surface of the fourth layer with which the first layer is not in contact is printed.

21. The laminate according to any one of 17 to 20, wherein a layer comprising a metal or a metal oxide is formed on the surface of the fourth layer with which the first layer is not in contact.

22. The laminate according to any one of 14 to 21, wherein an arithmetic average roughness Ra of the side of the first layer contacting the second layer when the second layer is separated from the laminate is 0.50 μm or less.

In addition, according to the present invention, a laminate, a method of manufacturing the same, and a method of manufacturing a molded article below are provided.

1. A laminate comprising:
a first layer comprising polypropylene, or polypropylene and modified polyolefin;
a second layer comprising one or more resins selected from the group consisting of polyethylene, polyamide, an ethylene-vinyl alcohol copolymer, and an ethylene-vinyl acetate copolymer; and
a third layer comprising one or more resins selected from the group consisting of polypropylene and polyethylene, and modified polyolefin,
wherein the ratio of modified polyolefin to 100 weight percent of one or more resins selected from the group consisting of polypropylene and polyethylene, and modified polyolefin in the third layer is larger than a ratio of the modified polyolefin to 100 weight percent of polypropylene, or polypropylene and modified polyolefin in the first layer.

2. The laminate according to 1, wherein a modification amount of a mixture of one or more resins selected from the group consisting of polypropylene and polyethylene, and modified polyolefin in the third layer is greater than the modification amount of polypropylene, or a mixture of polypropylene and modified polyolefin in the first layer.

3. The laminate according to 1 or 2, wherein modified polyolefin in the third layer is the same as the modified polyolefin in the first layer.

4. The laminate according to any one of 1 to 3, being separable at an interface between the first layer and the second layer.

5. The laminate according to any one of 1 to 4, wherein an arithmetic average roughness Ra of the interface of the first layer relative to the second layer is 0.50 μm or less.

6. The laminate according to any one of 1 to 5, wherein a crystal structure of polypropylene, or polypropylene and modified polyolefin in the first layer comprises smectic crystal.

7. The laminate according to any one of 1 to 6, wherein one or more fourth layers each comprising one or more resins selected from the group consisting of a urethane resin, an acrylic resin, polyolefin, and polyester are laminated on the surface of the first layer with which the second layer is not in contact.

8. The laminate according to 7, wherein when a thickness of the fourth layer is 150 μm, a tensile elongation at break of the fourth layer is 150% or more and 900% or less, and a softening temperature of the fourth layer is 50° C. or higher and 180° C. or lower.

9. The laminate according to 7 or 8, wherein a print layer is present on the surface of the fourth layer with which the first layer is not in contact.

10. The laminate according to 7 or 8, wherein a layer comprising a metal or a metal oxide is formed on the surface of the fourth layer with which the first layer is not in contact.

11. A method of manufacturing a laminate, which comprises: heating and melting polypropylene, or a mixture of polypropylene and modified polyolefin for a first layer, one or more resins selected from the group consisting of polyethylene, polyamide, an ethylene-vinyl alcohol copolymer, and an ethylene-vinyl acetate copolymer for a second layer, and a mixture of one or more resins selected from the group consisting of polypropylene and polyethylene, and modified polyolefin for a third layer; and forming and cooling the first layer, the second layer, and the third layer; thereby obtaining the laminate.

12. The method of manufacturing the laminate according to 11, wherein after the cooling,
one or more fourth layers each comprising one or more resins selected from the group consisting of a urethane resin, an acrylic resin, polyolefin, and polyester are laminated on the surface of the first layer with which the second layer is not in contact.

13. The method of manufacturing the laminate according to 12, which further comprises a step of printing the surface of the fourth layer with which the first layer is not in contact.

14. The method of manufacturing the laminate according to 12, which further comprises a step of forming a layer comprising a metal or a metal oxide on the surface of the fourth layer with which the first layer is not in contact.

15. A method of manufacturing a molded article, which comprises molding the laminate according to any one of 1 to 6 to obtain the molded article.

16. The method of manufacturing the molded article according to 15, wherein the molding is conducted by attaching the laminate to a die, and supplying a resin for molding to integrate the laminate with the resin for molding.

17. The method of manufacturing the molded article according to 15, wherein the molding is conducted by shaping the laminate in conformity to a die, attaching the shaped laminate to the die, and supplying a resin for molding to integrate the laminate with the resin for molding.

18. The method of manufacturing the molded article according to 15, wherein the molding comprises:
providing a core material in a chamber box;
disposing the laminate above the core material;
decompressing the inside of the chamber box;
heating and softening the laminate; and
pressing the heated and softened laminate on the core material to cover the core material.

19. The method of manufacturing the molded article according to any one of 15 to 18, which further comprises separating the second layer and the third layer from the laminate, to obtain a separated layer.

20. The method of manufacturing the molded article according to any one of 15 to 18, which further comprises, before the molding, separating the second layer and the third layer from the laminate to obtain a separated layer.

21. The method of manufacturing the molded article according to any one of 15 to 18, which further comprises, after the molding, separating the second layer and the third layer from the laminate to obtain a separated layer.

22. The method of manufacturing the molded article according to any one of 19 to 21, which further comprises, before the separating, laminating one or more fourth layers each comprising one or more resins selected from the group consisting of a urethane resin, an acrylic resin, polyolefin, and polyester on the surface of the first layer with which the second layer is not in contact.

23. The method of manufacturing the molded article according to any one of 19 to 21, which further comprises, after the separating, laminating one or more fourth layers each comprising one or more resins selected from the group consisting of a urethane resin, an acrylic resin, polyolefin, and polyester on the surface of the first layer opposite to the surface from which the second layer is separated.

24. The method of manufacturing the molded article according to 22 or 23, which further comprises a step of printing the surface of the fourth layer with which the first layer is not in contact.

25. The method of manufacturing the molded article according to 22 or 23, which further comprises a step of forming a layer comprising a metal or a metal oxide on the surface of the fourth layer with which the first layer is not in contact.

26. The method of manufacturing the molded article according to any one of 15 to 25, wherein an arithmetic average roughness Ra of the surface of the molded article from which the second layer is separated is 0.50 µm or less.

According to the present invention, it is possible to provide a novel laminate comprising a polypropylene sheet to decorate a molded article, a molded article using the laminate, and a method of manufacturing the same.

According to the present invention, it is possible to provide a laminate in which appearance of a molded article and handling at printing are satisfactory, a method of manufacturing the same, and a method of manufacturing a molded article.

BRIEF DESCRIPTION OF DRAWINGS

FIG. 1 is a schematic configuration diagram of one example of a manufacturing device to manufacture a laminate according to the present invention.

DESCRIPTION OF EMBODIMENTS

Hereinafter, embodiments of a laminate, a molded article using the laminate, and a method of manufacturing the same according to the present invention are specifically described. Numerical ranges indicated in the present description comprise end values therein.

A first embodiment of the present invention is described below.

[Laminate]

A laminate according to the first embodiment of the present invention (hereinafter, simply referred to as "a first laminate" in some cases) has a first layer comprising polypropylene, and a second layer comprising one or more selected from the group consisting of polyethylene, polyamide, an ethylene-vinyl alcohol copolymer, and an ethylene-vinyl acetate copolymer, wherein the thickness of the first layer is 60 µm to 250 µm, and the first layer and the second layer are in contact.

By having the above constitution, the first laminate according to the present invention is capable of separating (peeling) the second layer from the first layer.

By using the first laminate according to the present invention when manufacturing a molded article by injection molding or the like, it is possible to integrally manufacture the molded article having the surface thereof provided with the first layer. The second layer has only to be separated (peeled) from the first layer when the molded article is used.

The first layer of the first laminate according to the present invention comprises polypropylene. Thus, it is possible to provide a so-called decorative sheet having transparency, moldability, and chemical resistance.

When the first laminate according to the present invention is used for the manufacture of a molded article, the first layer becomes a component of the molded article to be manufactured, and is given onto the surface of the molded article. Consequently, the surface of the molded article can be decorated with the first layer of the laminate.

Polypropylene that can be used for the first layer includes homo-polypropylene, random polypropylene, block polypropylene, and the like. One of these polypropylene may be used alone, or two or more may be used as a mixture.

The isotactic pentad fraction of the polypropylene comprised in the first layer is preferably 80% or more and 99% or less, more preferably 86% or more and 98% or less, and further preferably 91% or more and 98% or less.

If the isotactic pentad fraction is 80% or more, the rigidity of the molded article manufactured by use of the first laminate according to the present invention can be satisfactory. On the other hand, if the isotactic pentad fraction is 99% or less, there is no concern of deterioration of transparency.

If the isotactic pentad fraction is within the above preferable range, transparency is obtained, and the molded article can be satisfactorily decorated.

It should be noted that the isotactic pentad fraction of the polypropylene does not change even after the polypropylene is formed into a molded article.

The isotactic pentad fraction is an isotactic fraction in a pentad unit (an isotactic bond of five successive polypropylene monomers) within a molecular chain of a resin component. A method of measuring this fraction is described in, for example, Macromolecules, Vol. 8, 1975, p. 687, and the fraction can be measured by 13C-NMR.

Polypropylene comprised in the first layer has a melt flow rate (hereinafter also referred to as "MFR") of preferably 0.5 g/10 minutes or more and 5.0 g/10 minutes or less, more preferably 1.5 g/10 minutes or more and 4.5 g/10 minutes or less, and further preferably 2.0 g/10 minutes or more and 4.0 g/10 minutes or less.

If the MFR is 0.5 g/10 minutes or more, shear stress at a die slip portion does not become excessively great during extrusion molding, so that there is no concern of deterioration of transparency due to acceleration of crystallization. On the other hand, if the MFR is 5.0 g/10 minutes or less, drawdown does not increase during hot molding, and there is no concern of deterioration of moldability.

The MFR can be measured in compliance with JIS-K7210, and can be measured at a measurement temperature of 230° C. and under a load of 2.16 kg.

Polypropylene comprised in the first layer preferably has an exothermic peak of 1.0 J/g or more, preferably 1.5 J/g or more on a low temperature side of a maximum endothermic peak on a differential scanning calorimetry curve.

Polypropylene comprised in the first layer preferably comprises smectic crystal.

Polypropylene is a crystalline resin, and can take a crystal form such as $\alpha$-crystal, $\beta$-crystal, $\gamma$-crystal, or smectic crystal. Among these crystal forms, the smectic crystal can be generated as an intermediate of amorphous and crystal by cooling polypropylene from a molten state at a speed of 80° C. or more per second. The smectic crystal does not have a stable structure taking a regular structure as in crystal, but has a metastable structure which is the gathering of microstructures. Thus, the smectic crystal is weak in the interaction between molecular chains, and has a property of easily softening if heated, as compared with $\alpha$-crystal and the like having stable structures.

The crystal structure of polypropylene can be confirmed by wide-angle X-ray diffraction (WAXD) with reference to a method used by T. Konishi, et al (Macromolecules, 38, 8749, 2005).

The first layer preferably does not comprise a nucleating agent. Even when the first layer comprises a nucleating agent, the content of the nucleating agent in the first layer is 1.0 mass percent or less, and preferably 0.5 mass percent or less.

Nucleating agents include, for example, a sorbitol nucleation agent, and the like. The commercialized products include, for example, GEL ALL MD (New Japan Chemical co., ltd.), RIKEMASTER FC-1 (Riken Vitamin Co., Ltd.), and the like.

Polypropylene comprised in the first layer is preferably polypropylene having a crystallization speed of 2.5 min$^{-1}$ or less at 130° C. from the viewpoint of moldability.

The crystallization speed of polypropylene is preferably 2.5 min$^{-1}$ or less, and more preferably 2.0 min$^{-1}$ or less. If the crystallization speed is more than 2.5 min$^{-1}$, the laminate heated and thus softened during shaping poorly expands because a part which has first contacted a die is rapidly cured, and a part forced to expand whitens, so that there is concern of deterioration of designability.

It should be noted that polypropylene does not change in crystallization speed even after formed into a molded article.

The crystallization speed can be measured by use of a differential scanning calorimeter (DSC).

Methods of causing polypropylene which is a crystalline resin to be transparent include, for example, a method which cools polypropylene at 80° C. or higher per second during the manufacture of the first layer to form smectic crystal, and a method which adds a nucleating agent to forcibly generate microcrystal. The nucleating agent improves the crystallization speed of polypropylene to a speed of more than 2.5 min$^{-1}$, and generates and fills with a large number of crystals, thereby eliminating the space for physical growth, and reducing the size of crystal. However, the nucleating agent has a nuclear substance, and is therefore slightly whitish even when transparent, so that there is concern of deterioration of designability.

Thus, it is possible to obtain a laminate having satisfactory designability by bringing the crystallization speed of polypropylene to 2.5 min$^{-1}$ or less without adding a nucleating agent, and cooling polypropylene at 80° C. or higher per second to form smectic crystal. Further, if shaping is conducted after later-described heating, the first layer makes the transition to $\alpha$-crystal while maintaining the microstructure derived from the smectic crystal. Surface hardness and transparency can be further improved by this transition.

The first layer has only to comprise polypropylene, and may further comprise other resin components. The other resin components include, for example, a modified polyolefin resin, cycloolefin, and the like. The modified polyolefin resin is a resin obtained by modifying polyolefin such as polypropylene or polyethylene with a modifying compound such as maleic anhydride, dimethyl maleate, diethyl maleate, acrylic acid, methacrylic acid, tetrahydrophthalic acid, glycidyl methacrylate, hydroxyethyl methacrylate, or methyl methacrylate. Strength of bonding to the second layer can be controlled by adjusting the amount (mass percent) of the other resin components comprised in the first layer.

From the viewpoint of heat resistance and hardness, the first layer preferably comprises polypropylene alone as a resin component other than additives described later. When the first layer comprises other resin components, the content of the other resin components is, for example, 1 mass percent to 30 mass percent, preferably 1 mass percent to 20 mass percent on the basis of the total mass of the resin components constituting the first layer.

It should be noted that the first layer may comprise additives such as a pigment, an antioxidant, a stabilizer, and an ultraviolet absorber if necessary. The content of the additives is not particularly limited as long as the function of the first laminate according to the present invention is not impaired.

The first layer of the first laminate according to the present invention has a thickness of 60 µm to 250 µm. It is not preferable that the thickness of the first layer is less than 60 µm, because with this thickness, rigidity becomes lower, and therefore, when a molded article is manufactured by injection molding with the use of a laminate, settability to a mold deteriorates or wrinkles are generated due to the pressure of the filling resin (resin for molded articles). In addition, it is not preferable that the thickness of the first layer is more than 250 µm, because when the first layer is molded into a desired shape by the pressure of the resin supplied into a die, resistance is increased, and the first layer can not be satisfactorily shaped in some cases. The thickness of the first layer is preferably 75 µm to 220 µm.

The second layer of the first laminate according to the present invention comprises one or more selected from the group consisting of polyethylene, polyamide, an ethylene-vinyl alcohol copolymer, and an ethylene-vinyl acetate copolymer. This makes it possible to reduce the occurrence of a warp resulting from a contraction difference between the first layer and the second layer, and smooth the surface of the first layer without any unpeeled parts left when the second layer is separated from the first layer (surface smoothness).

In the first laminate according to the present invention, the second layer serves to protect the first layer. When the first laminate according to the present invention is used to manufacture a molded article, the second layer is not intended to become a component of the manufactured molded article (final product), and is separated from the first layer.

Polyethylene that can be used in the second layer includes low density polyethylene, linear low density polyethylene, and high density polyethylene. From the viewpoint of the prevention of a warp and the surface smoothness of the first layer, linear low density polyethylene and low density polyethylene are preferred among others.

Polyamide that can be used in the second layer includes polyamide 66, polyamide 6, polyamide 1010, polyamide 12, polyamide 11, and the like. From the viewpoint of the prevention of a warp and the surface smoothness of the first layer, polyamide 1010, polyamide 12, and polyamide 11 are preferable among others.

From the viewpoint of the prevention of a warp and the surface smoothness of the first layer, the ethylene-vinyl alcohol copolymer used in the second layer preferably has an ethylene copolymerization ratio of 38 mol % to 47 mol %. Similarly, the ethylene-vinyl acetate copolymer used in the second layer preferably has an ethylene copolymerization ratio of 70 mol % to 90 mol %.

The second layer of the first laminate according to the present invention may comprise resins other than polyethylene, polyamide, an ethylene-vinyl alcohol copolymer, and an ethylene-vinyl acetate copolymer on the condition that the function of the first laminate according to the present invention is not impaired.

The thickness of the second layer of the first laminate according to the present invention is not particularly limited, but is, for example, 2 μm to 50 μm.

Moreover, the first laminate according to the present invention may further have a third layer comprising polypropylene. It is assumed that the third layer is in contact with the surface of the second layer with which the first layer is not in contact.

By having the third layer, it is possible to adjust the thickness of the first layer and/or the second layer while maintaining mechanical strength without changing the thickness of the first laminate according to the present invention. Therefore, the third layer can be used, for example, for the purpose of reinforcement by maintaining the thickness of the laminate when the thickness of the first layer is reduced.

The third layer of the first laminate according to the present invention may comprise polypropylene as a basic component, and comprise polyethylene and other resins on the condition that the function of the first laminate according to the present invention is not impaired.

In the first laminate according to the present invention, the third layer serves to protect the first layer together with the second layer. When the laminate according to the present invention is used for the manufacture of a molded article, the third layer is not intended to become a component of the manufactured molded article (final product), and is separated together with the second layer from the first layer.

Polypropylene that can be used in the third layer includes homo-polypropylene, random polypropylene, block polypropylene, and the like. One of these of polypropylene may be used alone, or two or more may be used as a mixture.

Other characteristics of polypropylene used in the third layer are as described for polypropylene used in the first layer. Polypropylene used in the third layer may be the same as or different from polypropylene used in the first layer.

Polyethylene that can be used in the third layer includes low density polyethylene, linear low density polyethylene, high density polyethylene, copolymers of ethylene and other monomers, and the like.

The third layer may further comprise other resin components. The other resin components include, for example, a modified polyolefin resin, cycloolefin, and the like. The modified polyolefin resin is a resin obtained by modifying polyolefin such as polypropylene or polyethylene with a modifying compound such as maleic anhydride, dimethyl maleate, diethyl maleate, an acrylic acid, a methacrylic acid, a tetrahydrophthalic acid, glycidyl methacrylate, hydroxyethyl methacrylate, methyl methacrylate, and the like. Strength of bonding to the second layer can be controlled by adjusting the amount (mass percent) of the other resin components comprised in the third layer. If the bonding strength of the second layer and the third layer is stronger than the bonding strength of the first layer and the second layer, it becomes possible to more easily separate (peel) the second layer and the third layer from the first layer instead of separating between the second layer and the third layer.

When the third layer comprises other resin components, the content of the other resin components is, for example, 1 mass percent to 50 mass percent, preferably 1 mass percent to 40 mass percent on the basis of the total mass of the resin components constituting the third layer.

The resin components constituting the third layer may be the same as or different from the resin components constituting the first layer. By using the laminate according to the present invention when manufacturing a molded article by injection molding or the like, it is possible to integrally manufacture the molded article having the surface thereof provided with the first layer. In order to separate (peel) the second layer from the first layer before or after injection molding, it is preferable that the third layer has such a resin component stronger in the property of bonding to the second layer as compared with the first layer.

It should be noted that the third layer may comprise additives such as a pigment, an antioxidant, a stabilizer, and an ultraviolet absorber if necessary. The content of the additives is not particularly limited as long as the function of the laminate according to the present invention is not impaired.

The thickness of the third layer of the first laminate according to the present invention is not particularly limited, but is, for example, 10 μm to 200 μm.

Moreover, the first laminate according to the present invention may further have a fourth layer comprising one or more selected from the group consisting of a urethane resin, an acrylic resin, polyolefin, and polyester. It is assumed that the fourth layer is in contact with the surface of the first layer with which the second layer is not in contact.

By having the fourth layer, it is possible to improve ink adhesion to the first layer (printability).

In the first laminate according to the present invention, the fourth layer serves to decorate the surface of the first layer (i.e., the surface of the molded article which is a final product) and increase the designability. When the first laminate according to the present invention is used for the manufacture of a molded article, the fourth layer becomes a component of the manufactured molded article (final product) together with the first layer. Further, when the fourth layer is printed, the fourth layer intervenes between the first layer and a print layer and thus enhances ink adhesion.

A urethane resin that can be used in the fourth layer is obtained by reacting diisocyanate, high molecular weight polyol, and a chain extender. High molecular weight polyol is selected from polyether polyol or polycarbonate polyol. Diisocyanate and a chain extender used are not particularly limited, and known diisocyanate and chain extender can be used. By using such a urethane resin, it is possible to satisfactorily form a layer constitution following the first layer even when the first laminate according to the present invention is molded into a complex and non-planar shape. For example, even when a print layer is provided on the side of the fourth layer opposite to the first layer, it is possible to prevent disadvantages such as cracking or peeling of the print layer.

Acrylic resins that can be used in the fourth layer are not particularly limited, and known acrylic resins can be used.

Polyolefin that can be used in the fourth layer is not particularly limited, and known polyolefin can be used.

Polyester that can be used in the fourth layer is not particularly limited, and known polyester can be used.

The fourth layer has only to comprise one or more selected from the group consisting of a urethane resin, an acrylic resin, polyolefin, and polyester, and may further comprise other resin components on the condition that the advantageous effects of the first laminate according to the present invention are not impaired.

From the viewpoint of adhesion to polypropylene comprised in the first layer and ink, and of moldability, the fourth layer preferably comprises a urethane resin, and more preferably comprise a urethane resin alone.

It is defined that the fourth layer is stronger in the property of bonding to the first layer as compared with the second layer.

The thickness of the fourth layer is preferably 0.01 µm to 3 µm, and more preferably 0.03 µm to 0.5 µm. The thickness of the fourth layer is preferably 0.01 µm or more, because with this thickness, satisfactory ink adhesion can be obtained. On the other hand, the thickness of the fourth layer is preferably 3 µm or less, because with this thickness, stickiness that causes blocking does not occur.

The fourth layer has a tensile elongation at break of, for example, 150% to 900%, preferably 200% to 850%, and more preferably 300% to 750%. The tensile elongation at break of the fourth layer is preferably 150% or more, because with this tensile elongation at break, the fourth layer can follow the elongation of the first layer during hot molding and is not cracked, and the print layer and a metal layer are not cracked or peeled. Further, the tensile elongation at break is preferably 900% or less, because with this tensile elongation at break, water resistance does not deteriorate.

It should be noted that the tensile elongation at break can be measured with a sample having a thickness of 150 µm by a method compliant with JIS K7311.

The fourth layer has a softening temperature of, for example, 50° C. to 180° C., preferably 90° C. to 170° C., more preferably 100° C. to 165° C. The softening temperature of the fourth layer is preferably 50° C. or higher, because at this softening temperature, there is no concern of insufficient strength of the fourth layer at normal temperature, and of cracking or peeling of the print layer and the metal layer. Further, the softening temperature of the fourth layer is preferably 180° C. or lower, because at this softening temperature, the fourth layer is sufficiently softened during hot molding and is therefore not cracked, and the print layer and the metal layer are not cracked or peeled.

It should be noted that the softening temperature can be a flow start temperature measured by a Koka flow tester.

The fourth layer may be formed from a plurality of layers. In a plurality of layers, the material of each layer may be different. Thus, the fourth layer can be constituted by the combination of a layer that is highly adhesive to the first layer, and a layer that is highly adhesive to the layer (e.g., print layer) laid on the surface of the fourth layer with which the first layer is not in contact.

Moreover, the first laminate according to the present invention may have printing (a print layer) laid on the surface of the fourth layer with which the first layer is not in contact.

As a printing method, it is possible to use a general printing method such as a screen printing method, an offset printing method, a gravure printing method, a roll coating method, and a spray coating method. The screen printing method, in particular, is preferable because this method permits a greater thickness of ink, and therefore does not easily cause ink cracking in the case of molding into a complex shape.

For example, in the case of the screen printing, ink that is satisfactorily elongated during molding is preferable, and FM3107 high-concentration white or SIM3207 high-concentration white manufactured by Jujo Chemical Co., Ltd. and the like can be, but not exclusively, shown by way of example.

Furthermore, the first laminate according to the present invention may further comprise a layer comprising a metal or a metal oxide, on the surface of the fourth layer with which the first layer is not in contact.

The metal formed on the surface of the fourth layer with which the first layer is not in contact is not particularly limited as long as the metal can give a metallic design to the laminate. Such a metal includes, for example, tin, indium, chromium, aluminum, nickel, copper, silver, gold, platinum, zinc, and an alloy comprising at least one of these metals. Among others, tin, indium, and aluminum are considered preferable from the viewpoint of rich extensibility. It should be noted that the formation of the layer comprising a metal or a metal oxide rich in extensibility provides an advantage that cracking is less likely to occur when the laminate is three-dimensionally molded. The layer comprising a metal or a metal oxide may be formed by one kind of metal, or may be formed by two or more of metals.

The thickness of the first laminate according to the present invention does not depend on the layer constitution, and is preferably 62 µm to 252 µm, more preferably 75 µm to 230 µm, even more preferably 120 µm to 200 µm. When the thickness of the laminate is 62 µm or more, the rigidity of the laminate itself is sufficient, so that there is no deterioration of workability such as the tendency of the laminate to wrinkle, and the falling of the laminate from a rack in drying during screen printing. The thickness of the laminate is preferably 252 µm or less, because with this thickness, a flow path during injection molding is secured, resistance at the time of resin filling does not increase, and there is no deterioration of moldability.

When the second layer is separated from the first laminate according to the present invention, the arithmetic average roughness Ra of the side of the first layer contacting the second layer is preferably 0.50 µm or less, and more preferably 0.40 µm or less. The Ra is preferably 0.50 µm or less, because with this Ra, the surface is smooth, the glossiness of the surface does not deteriorate, and the designability of the molded article is therefore not impaired.

The arithmetic average roughness Ra can be measured by use of, for example, a 3D measuring laser microscope.

A second embodiment of the present invention is described below.

A laminate according to a second embodiment of the present invention (hereinafter, simply referred to as "a second laminate" in some cases) has a first layer comprising polypropylene, or polypropylene and modified polyolefin, a second layer comprising one or more resins selected from the group consisting of polyethylene, polyamide, an ethylene-vinyl alcohol copolymer, and an ethylene-vinyl acetate copolymer, and a third layer comprising one or more resins selected from the group consisting of polypropylene and polyethylene, and modified polyolefin, wherein the ratio of modified polyolefin to 100 weight percent of one or more resins selected from the group consisting of polypropylene and polyethylene, and modified polyolefin in the third layer is larger than the ratio of modified polyolefin to 100 weight percent of polypropylene, or polypropylene and modified polyolefin in the first layer.

Thus, it is possible to selectively separate at an interface between the first layer and the second layer of the second laminate according to the present invention. It is preferable to be able to separate (peel) at the interface between the first layer and the second layer.

Accordingly, when a molded article is formed from the second laminate according to the present invention, it is possible to prevent the second-layer-side surface of the first layer to be the outermost surface of the molded article from being damaged or having foreign objects adhering thereto.

The thickness of the second laminate according to the present invention is preferably 62 to 262 µm, and more preferably 75 to 230 µm.

The thickness of the first layer is preferably 60 to 250 µm, and more preferably 75 to 220 µm.

The thickness of the second layer is preferably 2 to 50 µm, and more preferably 2 to 30 µm.

The thickness of the third layer is preferably 10 to 200 µm, and more preferably 20 to 125 µm.

In the first layer, polypropylene is a polymer comprising at least propylene. Specifically, such a polymer includes homo-polypropylene, and a copolymer of propylene and olefin, and the like. Homo-polypropylene, in particular, is preferable for reasons of heat resistance and hardness.

The copolymer may be a block copolymer or a random copolymer, or may be a mixture thereof.

Olefin includes ethylene, butylene, cycloolefin, and the like.

These substances may be singly used, or a combination of two or more of substances may be used.

The preferred ranges and the measurement methods of the isotactic pentad fraction and the melt flow rate of polypropylene comprised in the first layer of the second laminate according to the present invention are the same as those for polypropylene comprised in the first layer of the first laminate according to the present invention.

Polypropylene, or polypropylene and modified polyolefin comprised in the first layer preferably have an exothermic peak of 1.0 J/g or more, preferably 1.5 J/g or more on a low temperature side of a maximum endothermic peak on a differential scanning calorimetry curve.

Polypropylene, or polypropylene and modified polyolefin comprised in the first layer preferably comprise smectic crystal.

Polypropylene is a crystalline resin, and can take a crystal form such as α-crystal, β-crystal, γ-crystal, or smectic crystal. Among these crystal forms, the smectic crystal can be generated as an intermediate of amorphous and crystal by cooling polypropylene from a molten state at a speed of 80° C. or higher per second. The smectic crystal does not have a stable structure taking a regular structure as in crystal, but has a metastable structure which is the gathering of microstructures. Thus, the smectic crystal is weak in the interaction between molecular chains, and has a property of easily softening if heated, as compared with α-crystal and the like having stable structures.

Otherwise, polypropylene may comprise other crystal forms such as β-crystal, γ-crystal, and an amorphous part.

30% or more, 50% or more, 70% or more, or 90% or more of polypropylene, or polypropylene and modified polyolefin in the first layer may be smectic crystal.

The crystal structure of polypropylene, or polypropylene and modified polyolefin can be confirmed by wide-angle X-ray diffraction (WAXD) with reference to a method used by T. Konishi, et al (Macromolecules, 38, 8749, 2005).

The first layer preferably does not comprise a nucleating agent. Even when the first layer comprises a nucleating agent, the content of the nucleating agent in the first layer is 1.0 mass percent or less, and preferably 0.5 mass percent or less.

Nucleating agents include, for example, a sorbitol nucleation agent, and the like. Commercialized products include, for example, GEL ALL MD (New Japan Chemical co., ltd.), RIKEMASTER FC-1 (Riken Vitamin Co., Ltd.), and the like.

Polypropylene, or polypropylene and modified polyolefin comprised in the first layer is preferably polypropylene having a crystallization speed of 2.5 $min^{-1}$ or less at 130° C. from the viewpoint of moldability.

The crystallization speed of polypropylene, or polypropylene and modified polyolefin is preferably 2.5 $min^{-1}$ or less, and more preferably 2.0 $min^{-1}$ or less. If the crystallization speed is more than 2.5 $min^{-1}$, the laminate heated and thus softened during shaping poorly expands, because a part which has first contacted a die is rapidly cured, and a part forced to expand whitens, so that there is concern of deterioration of designability.

It should be noted that polypropylene, or polypropylene and modified polyolefin do not change in crystallization speed even after formed into a molded article.

The crystallization speed can be measured by use of a differential scanning calorimeter (DSC).

Methods of causing polypropylene which is a crystalline resin to be transparent include, for example, a method which cools polypropylene at 80° C. or higher per second during the manufacture of the first layer to form smectic crystal, and a method which adds a nucleating agent to forcibly generate microcrystal. The nucleating agent improves the crystallization speed of polypropylene to more than 2.5 $min^{-1}$, and generates and fills with a large number of crystals, thereby eliminating the space for physical growth, and reducing the size of crystal. However, the nucleating agent has a nuclear substance, and is therefore slightly whitish even when transparent, so that there is concern of deterioration of designability.

Thus, it is possible to obtain a laminate having satisfactory designability by bringing the crystallization speed of polypropylene to 2.5 $min^{-1}$ or less without adding the nucleating agent, and cooling polypropylene at 80° C. or higher per second to form smectic crystal. Further, if shaping is conducted after later-described heating, the first layer makes the transition to α-crystal while maintaining the microstructure derived from the smectic crystal. Surface hardness and transparency can be further improved by this transition.

Modified polyolefin is a modified product of an olefin polymer with a modifying compound.

The olefin polymer includes homo-polypropylene, homo-polyethylene, a copolymer of propylene and olefin, a copolymer of ethylene and olefin, polycycloolefin, and the like. Olefin includes substances similar to the above.

These substances may be singly used, or a combination of two or more of substances may be used.

The modifying compound includes maleic anhydride, dimethyl maleate, diethyl maleate, an acrylic acid, a methacrylic acid, a tetrahydrophthalic acid, glycidyl methacrylate, hydroxyethyl methacrylate, methyl methacrylate, and the like.

Polyolefin such as polyethylene and olefin copolymer may be comprised in addition to polypropylene, or polyolefin and modified polyolefin. Linear low density polyethylene is preferable.

Olefin includes substances similar to the above.

If necessary, additives such as a pigment, an antioxidant, a stabilizer, an ultraviolet absorber, and a nucleating agent may be blended with polypropylene, or polypropylene and modified polyolefin.

The second layer comprises one or more resins selected from the group consisting of polyethylene, polyamide, an ethylene-vinyl alcohol copolymer, and an ethylene-vinyl acetate copolymer, thereby making it possible to prevent the occurrence of a warp resulting from a contraction difference between the first layer and the second layer, and to smooth the surface of the first layer.

Polyethylene, polyamide, an ethylene-vinyl alcohol copolymer, and an ethylene-vinyl acetate copolymer that can be used in the second layer are the same as polyethylene, polyamide, an ethylene-vinyl alcohol copolymer, and an ethylene-vinyl acetate copolymer described for the second layer of the first laminate.

In the third layer, polypropylene and modified polyolefin can be similar to polypropylene and modified polyolefin in the first layer.

It is preferable that modified polyolefin in the third layer is the same as modified polyolefin in the first layer.

Moreover, in the third layer, polyethylene can be similar to polyethylene in the second layer.

If necessary, additives such as a pigment, an antioxidant, a stabilizer, and an ultraviolet absorber may be blended with one or more resins selected from the group consisting of polypropylene and polyethylene, and modified polyolefin.

It is preferable that in the second laminate according to the present invention, the first layer and the second layer are in contact with each other, and the second layer and the third layer are in contact with each other.

The ratio of modified polyolefin to 100 weight percent of one or more resins selected from the group consisting of polypropylene and polyethylene, and modified polyolefin in the third layer is larger than the ratio of modified polyolefin to 100 weight percent of polypropylene, or polypropylene and modified polyolefin in the first layer, preferably 5 weight percent to 25 weight percent higher, and more preferably 7 weight percent to 15 weight percent higher.

The ratio of modified polyolefin to 100 weight percent of polypropylene, or polypropylene and modified polyolefin in the first layer includes a ratio of 0 weight percent or more and less than 25 weight percent, a ratio of 0 weight percent or more and 30 weight percent or less, a ratio of 5 weight percent or more and 24 weight percent or less, and a ratio of 10 weight percent or more and 22 weight percent or less, and the like.

The ratio of modified polyolefin to 100 weight percent of one or more resins selected from the group consisting of polypropylene and polyethylene, and modified polyolefin in the third layer includes a ratio of more than 25 weight percent and 45 weight percent or less, a ratio of 20 weight percent or more and 50 weight percent or less, a ratio of 27 weight percent or more and 40 weight percent or less, and a ratio of 28 weight percent or more and 35 weight percent or less, and the like.

In the first layer, for example, 90 weight percent or more, 95 weight percent or more, 98 weight percent or more, or 100 weight percent of the first layer may be polypropylene, or polypropylene and modified polyolefin.

In the third layer, for example, 90 weight percent or more, 95 weight percent or more, 98 weight percent or more, or 100 weight percent of the third layer may be one or more resins selected from the group consisting of polypropylene and polyethylene, and modified polyolefin.

It is preferable that the modification amount of a mixture of one or more resins selected from the group consisting of polypropylene and polyethylene, and modified polyolefin in the third layer is greater than the modification amount of polypropylene, or a mixture of polypropylene and modified polyolefin in the first layer.

It is preferable that the acid value of a mixture of one or more resins selected from the group consisting of polypropylene and polyethylene, and modified polyolefin in the third layer is higher than the acid value of polypropylene, or a mixture of polypropylene and modified polyolefin in the first layer.

It is preferable that the modification rate of the third layer is higher than the modification ratio of the first layer.

Thus, the adhesion strength of the second layer and the third layer is greater than the adhesion strength of the first layer and the second layer, and separation is therefore more likely to selectively occur at the interface between the first layer and the second layer.

The second laminate according to the present invention may have one or more fourth layers each comprising one or more resins selected from the group consisting of a urethane resin, an acrylic resin, polyolefin, and polyester laminated on the surface of the first layer with which the second layer is not in contact (on the surface opposite to the surface which contacts the second layer).

In view of the adhesion to the first layer and the later-described print layer, and moldability, the resin of the fourth layer is preferably a urethane resin. The urethane resin includes HYDRAN WLS-202 (manufactured by DIC Corporation) and the like.

Consequently, it is possible to provide a laminate having satisfactory ink adhesion.

A urethane resin, an acrylic resin, polyolefin, and polyester comprised in the fourth layer of the second laminate according to the present invention can be the same as a urethane resin, an acrylic resin, polyolefin, and polyester comprised in the fourth layer of the first laminate according to the present invention.

The preferred thickness, layer constitution, tensile elongation at break, and softening temperature of the fourth layer of the second laminate according to the present invention are the same as those of the fourth layer of the first laminate according to the present invention.

Furthermore, as in the case of the fourth layer of the first laminate, printing (a print layer) may be laid, or a layer comprising a metal or a metal oxide may be further formed on the surface of the fourth layer of the second laminate with which the first layer is not in contact.

A printing method, a metal, and a metal oxide are similar to those in the case of the first laminate.

In the second laminate according to the present invention, an arithmetic average roughness Ra of the interface of the first layer relative to the second layer is preferably 0.50 μm or less. The arithmetic average roughness Ra is more preferably 0.40 μm or less.

When the Ra is more than 0.50 μm, the surface is no longer smooth, the glossiness of the surface deteriorates, and there is therefore concern that the designability of the molded article is impaired.

The Ra is preferably measured after the second layer and the third layer are separated from the first layer. The arithmetic average roughness Ra of the interface of the first layer relative to the second layer in the laminate is normally not different from the arithmetic average roughness Ra of the interface of the first layer relative to the second layer after the second layer and the third layer are separated from the first layer.

[Method of Manufacturing Laminate]

The first laminate according to the present invention having the first layer and the second layer, and optionally the third layer can be manufactured by a coextrusion method.

The second laminate according to the present invention having the first layer, the second layer, and the third layer can also be manufactured by a coextrusion method.

For example, the mixture and resin melted by an extruder for each of the first, second, and third layers are laminated by a lamination device such as a feed block or a distributor, shaped into a sheet form by a dice, and then extruded. In this instance, laminating and shaping may be conducted by a multi-manifold die which serves as a lamination device and a dice.

The molten-state laminate shaped into the sheet form is introduced, by a device having a mirror surface endless belt wound around a plurality of cooling rolls and a mirror surface cooling roll, into the space between the mirror surface cooling roll and the mirror surface endless belt, pressure-welded, cooled at a speed of 80° C./sec or more, and then molded into a sheet form.

In the method of manufacturing the first laminate according to the present invention, polypropylene for a first layer, and one or more resins selected from the group consisting of polyethylene, polyamide, an ethylene-vinyl alcohol copolymer, and an ethylene-vinyl acetate copolymer for a second layer are heated and melted, the first layer and the second layer are formed and cooled, whereby a laminate can be obtained.

In the method of manufacturing the second laminate according to the present invention, polypropylene, or a mixture of polypropylene and modified polyolefin for a first layer, one or more resins selected from the group consisting of polyethylene, polyamide, an ethylene-vinyl alcohol copolymer, and an ethylene-vinyl acetate copolymer for a second layer, and a mixture of one or more resins selected from the group consisting of polypropylene and polyethylene, and modified polyolefin for a third layer are heated and melted, the first layer, the second layer, and the third layer are formed and cooled, whereby a laminate can be obtained.

Thus, it is possible to prevent damage and foreign objects between the sheet molding and the protective film affixing.

The first layer for decoration and the second layer to be a protective film are laminated in a molten state by the coextrusion method, cooled and solidified in an integrated state, and then shaped into a sheet. Consequently, the molten laminate can be cooled and solidified with the thickness at which air is not easily brought in. Moreover, a thin transparent polypropylene sheet is obtained by peeling the second layer from the laminate obtained as above, and it is therefore possible to easily provide a thin decorative sheet having satisfactory molding workability.

When manufacturing the first and second laminates according to the present invention, it is preferable to melt the material of each layer, and cool the material at a cooling speed of 80° C./sec or more until the internal temperature of the laminate becomes equal to or less than a crystallization temperature. Cooling is preferably at 90° C./sec or more, more preferably at 150 to 30,000° C./sec.

When cooled at 80° C./sec or more from a molten state, polypropylene, or polypropylene and modified polyolefin have a structure in which smectic crystal has a majority. Smectic crystal is an intermediate phase of a metastable state, and high in transparency because every single domain size is small. Additionally, since smectic crystal is in the metastable state, the sheet is softened with a low calorie, and smectic crystal therefore has a characteristic of higher moldability as compared to a crystal advanced in crystallization.

It should be noted that smectic crystal can be confirmed by an X-ray diffraction measurement method.

In this case, rapid cooling is preferably carried out by use of a cooling roll kept at a surface temperature of a dew point or higher and 50° C. or lower. In this way, whitening of the sheet can be further prevented.

Furthermore, the first and second laminates according to the present invention can be manufactured by use of a device which is equipped with a mirror surface endless belt wound around a plurality of cooling rolls and a mirror surface cooling roll and in which the surface temperatures of the mirror surface endless belt and the mirror surface cooling roll are kept at the dew point or higher and 50° C. or lower.

In this case, the molten material of each layer is introduced by a T-die extruder into the space between the mirror surface cooling roll and the mirror surface endless belt, pressure-welded, and then molded into a sheet form. The mirror surface endless belt is sprayed with cooling water lower in temperature than the surface temperature of this belt, and thus rapidly cooled, whereby a sheet is manufactured.

The obtained sheet (laminate) is molded into a non-planar shape, and provided in at least a portion of a substrate. Whitening of the sheet can be prevented even if the sheet is molded into a complex shape, and the sheet can be decoratively molded in a satisfactory manner without impairing the appearance of even a molded article having a complicated shape.

A schematic configuration diagram of one example of a manufacturing device to manufacture the first and second laminates according to the present invention is shown in FIG. 1.

A manufacturing device shown in FIG. 1 comprises a T-die 12 of an extruder, a first cooling roll 13, a second cooling roll 14, a third cooling roll 15, a fourth cooling roll 16, a metallic endless belt 17, and a peeling roll 21.

A method of manufacturing a laminate sheet (laminate) 11 by rapid cooling using the manufacturing device having the above configuration is described below.

First, the temperatures of each of the cooling rolls 13, 14, 15, and 16 are controlled in advance so that the surface temperatures of the metallic endless belt 17 and the fourth cooling roll 16 which directly contact and cool an extruded molten resin are kept at a dew point or higher and 50° C. or lower, preferably 30° C. or lower.

Here, when the surface temperatures of the fourth cooling roll 16 and the metallic endless belt 17 are less than or equal to the dew point, there is a possibility that production of a uniform film may become difficult due to dew condensation on the surface. On the other hand, when the surface temperature is higher than 50° C., the transparency of the laminate sheet 11 to be obtained is lower, α-crystals increase, and there is a possibility that hot molding may become difficult. Therefore, the surface temperature is, for example, 20° C.

Next, the molten resin (comprising no nucleating agent) extruded by the T-die 12 of the extruder is interposed between the metallic endless belt 17 and the fourth cooling roll 16 on the first cooling roll 13. In this state, the molten resin is pressure-welded by the first and fourth cooling rolls 13 and 16, and rapidly cooled at 14° C.

In this instance, an elastic material 22 is compressed and thus elastically deformed by pressing force between the first cooling roll 13 and the fourth cooling roll 16.

In the portion of the elastic material 22 elastically deformed, i.e., an arc portion corresponding to a center angle θ1 of the first cooling roll 13, the rapidly cooled sheet is planarly pressure-welded by each of the cooling rolls 13 and 16. Surface pressure in this instance is normally 0.1 MPa or more and 20 MPa or less.

The sheet pressure-welded as described above and interposed between the fourth cooling roll 16 and the metallic endless belt 17 is then interposed between the metallic endless belt 17 and the fourth cooling roll 16 in an arc portion corresponding to the substantially lower half periphery of the fourth cooling roll 16, and thereby planarly pressure-welded. Surface pressure in this instance is normally 0.01 MPa or more and 0.5 MPa or less.

After being planarly pressure-welded and cooled by the fourth cooling roll 16 as above, the sheet adhering to the metallic endless belt 17 is moved onto the second cooling roll 14 along with the rotation of the metallic endless belt 17. Here, the sheet guided by the peeling roll 21 and then pressed against the second cooling roll 14 side is planarly pressure-welded by the metallic endless belt 17 in an arc portion corresponding to the substantially upper half periphery of the second cooling roll 14, in a manner similar to the above, and again cooled at a temperature of 30° C. or lower. Surface pressure in this instance is normally 0.01 MPa or more and 0.5 MPa or less.

The laminate sheet cooled on the second cooling roll 14 is peeled from the metallic endless belt 17 by the peeling roll 21, and wound by a winding roll (not shown) at a predetermined speed.

The method of manufacturing the first and second laminates according to the present invention may comprise a step of laminating the fourth layer described above.

The fourth layer of the laminate according to the present invention can be formed by, for example, coating, with a urethane resin using a gravure coater, a kiss coater, a bar coater, or the like, the surface of the first layer with which the second layer is not in contact, and drying the urethane resin at 80° C. for one minute.

The method of manufacturing the first and second laminates according to the present invention may comprise a step of printing. Thus, the print layer described above is formed.

As described above, printing can be performed by a general printing method such as a screen printing method, an offset printing method, a gravure printing method, a roll coating method, and a spray coating method.

The method of manufacturing the first and second laminates according to the present invention may comprise a step of forming the layer comprising the metal or metal oxide described above.

The method of forming the layer comprising the metal or metal oxide is not particularly limited, but from the viewpoint of giving a metallic design with high texture and a luxurious feel to the laminate, the method is preferably, for example, a vapor deposition method such as a vacuum deposition method, a sputtering method, an ion plating method using the above-described metal. The vacuum deposition method, in particular, is preferable in terms of low cost and less damage to an object targeted for vapor deposition. Conditions for the vapor deposition may be suitably set in accordance with the melting temperature or evaporating temperature of the metal to be used. Further, instead of the vapor deposition methods described above, a method which coats with a paste comprising the above-described metal, a plating method using the above-described metal, or the like can also be used.

[Molded Article and Method of Manufacturing Same]

(1) Method of Manufacturing Molded Article Using First Laminate

A decorated molded article can be manufactured with good molding workability by use of the first laminate according to the present invention.

One embodiment of a method of manufacturing a molded article using a first laminate according to the present invention (hereinafter, simply referred to as "a first method of manufacturing a molded article according to the present invention" in some cases) comprises a step (a) of manufacturing the molded article by use of a laminate that has a first layer comprising polypropylene, and a second layer comprising one or more selected from the group consisting of polyethylene, polyamide, an ethylene-vinyl alcohol copolymer, and an ethylene-vinyl acetate copolymer.

In the present embodiment, the method may further comprise a step (b) of separating the second layer from the laminate.

Another embodiment of the first method of manufacturing a molded article according to the present invention comprises a step (a) of manufacturing the molded article by use of a laminate that has a first layer comprising polypropylene, a second layer comprising one or more selected from the group consisting of polyethylene, polyamide, an ethylene-vinyl alcohol copolymer, and an ethylene-vinyl acetate copolymer, and a third layer comprising polypropylene.

In the present embodiment, the method may further comprise a step (b) of separating the second layer and the third layer from the laminate.

In the first method of manufacturing a molded article according to the present invention, the separation in the step (b) means peeling the first layer and the second layer (as well as the third layer), and causing the first layer and the second layer (as well as the third layer) to be independently present. The step (b) can be performed at any timing, for example, before printing, before preliminary shaping, before injection molding, after injection molding, and before the use of a molded product, in accordance with processing and the purpose of use.

Regarding the layer resulting from separating the second layer from the first laminate according to the present invention, the arithmetic average roughness Ra of the side of the first layer contacting the second layer is preferably 0.50 μm or less. The Ra is preferably 0.50 μm or less, because with this Ra, the surface is smooth, the glossiness of the surface does not deteriorate, and the designability of the molded article is therefore not impaired.

The arithmetic average roughness Ra can be measured by use of, for example, a 3D measuring laser microscope.

In the first method of manufacturing a molded article according to the present invention, if the first laminate according to the present invention is used to manufacture a molded article by the step (a), a molded article with a desired decoration can be manufactured.

The step (a) can be performed by in-mold molding. Specifically, the laminate is attached to a die, and a resin for molded articles is supplied to integrate the laminate with the resin for molded articles. It is possible to manufacture a molded article having, on its surface, the laminate while shaping the laminate by the pressure of the resin for molded articles supplied into the die.

Furthermore, the step (a) can be performed by insert molding. Specifically, the laminate is shaped (preliminarily shaped) in conformity to a die, the shaped first layer is attached to the die, and a resin for molded articles is supplied to integrate the laminate with the resin for molded articles. The laminate can be shaped by vacuum molding, air pressure molding, vacuum air pressure molding, press molding, plug-assist molding, or the like.

The resin for molded articles used in the in-mold molding and insert molding is not particularly limited as long as such a resin is a thermoplastic resin, and includes, for example, polypropylene, an ABS resin, polyamide, and the like.

Alternatively, the step (a) may be performed by providing a core material in a chamber box, disposing the laminate above the core material, decompressing the inside of the chamber box, heating and softening the laminate, and pressing the heated and softened laminate on the core material to cover the core material.

The core material may have a protruding shape or a depressed shape, and includes, but not limited to, a resin, a metal, ceramics, or the like having a three-dimensional curved surface.

Specifically, it is preferable to use a chamber box composed of upper and lower two molding chambers separable from each another.

First, the core material is mounted and set on a table in the lower molding chamber. A laminate according to the present invention which is an object to be molded is fixed to the upper surface of the lower molding chamber by a clamp. In this instance, the upper and lower molding chambers are at atmospheric pressure inside.

Then the upper molding chamber is lowered, the upper and lower molding chambers are joined to each other, and the inside of the chamber box is brought into a closed state. Both of the insides of the upper and lower molding chambers are brought into a vacuum suction state from an atmospheric-pressure state by a vacuum tank.

After the insides of the upper and lower molding chambers are brought into the vacuum suction state, a heater is turned on to heat a decorative sheet. Then the table in the lower molding chamber is raised while the insides of the upper and lower molding chambers are in a vacuum state.

Then the vacuum in the upper molding chamber is released, the atmospheric pressure is brought therein, and the laminate according to the present invention which is an object to be molded is thereby pressed against the core material and overlaid (molded). Note that it is also possible to cause the laminate according to the present invention which is an object to be molded to adhere to the core material with greater force by supplying compressed air into the upper molding chamber.

After the completion of the overlay, the heater is turned off, the vacuum inside the lower molding chamber is also released to bring the lower molding chamber back to the atmospheric pressure, the upper molding chamber is raised, and a product covered with a decorated and printed laminate as a front cover material is taken out.

One embodiment of the first method of manufacturing a molded article according to the present invention may further comprise, before the step (a), a step (c) of forming a fourth layer comprising one or more selected from the group consisting of a urethane resin, an acrylic resin, polyolefin, and polyester on the surface of the first layer with which the second layer is not in contact. The step (c) can be performed before or after the step (b).

Moreover, one embodiment of the first method of manufacturing a molded article according to the present invention may further comprise, after the step (c), a step (d) of printing the surface of the fourth layer with which the first layer is not in contact, and the step (a) or the step (b) may be performed thereafter.

Furthermore, one embodiment of the first method of manufacturing a molded article according to the present invention may further comprise a step (e) of forming a layer comprising, after the step (d), a metal or a metal oxide on the surface of the fourth layer with which the first layer is not in contact, and the step (a) or the step (b) may be performed thereafter.

(2) Method of Manufacturing Molded Article Using Second Laminate

In the method of manufacturing a molded article using the second laminate according to the present invention (hereinafter, simply referred to as "a second method of manufacturing a molded article according to the present invention" in some cases), the laminate described above is molded, and a molded article can be obtained.

Thus, the second-layer-side surface of the first layer to be the outermost surface of the molded article does not contact the guide roll or the like, and is therefore not damaged or does not contact the outside air, so that foreign objects do not adhere thereto, and a molded article having satisfactory appearance can be obtained.

Methods of molding include in-mold molding, insert molding, TOM method, and the like.

The in-mold molding is a method of obtaining a molded article by placing a laminate in a mold, and then molding the laminate into a desired shape with the pressure of the resin for molding supplied into the mold.

The in-mold molding is preferably carried out by attaching a laminate to a die, and supplying a resin for molding thereto to integrate the laminate with the resin.

The insert molding is a method of obtaining a molded article by preliminarily shaping a shaper to be placed in a die, and filling the shape thereof with a resin for molding. A more complex shape can be produced.

The insert molding is preferably carried out by shaping a laminate in conformity to a die, attaching the shaped laminate to the die, and supplying a resin for molding to integrate the laminate with the resin for molding.

Shaping (preliminarily shaping) in conformity to a die is preferably carried out by vacuum molding, air pressure molding, vacuum air pressure molding, press molding, plug-assist molding, or the like.

The resin for molding is preferably a moldable thermoplastic resin. Specifically, polypropylene, polyethylene, polycarbonate, an acetylene-styrene-butadiene copolymer, an acryl polymer, and the like can be, but not exclusively, shown by way of example. An inorganic filler of fiber, talc, or the like may be added.

Supply is preferably performed by injection, and the pressure is preferably 5 MPa or more and 120 MPa or less.

The die temperature is preferably 20° C. or higher and 90° C. or lower.

The TOM method is preferably carried out by providing a core material in a chamber box, disposing a laminate above the core material, decompressing the inside of the chamber box, heating and softening the laminate, bringing the laminate into contact with the upper surface of the core material, and pressing the heated and softened laminate on the core material to cover the core material.

It is preferable to bring the laminate into contact with the upper surface of the core material after heating and softening.

Pressing is preferably performed such that in the chamber box, while the side of the laminate contacting the core material is decompressed, the side of the laminate opposite to the core material is pressurized.

The core material may have a protruding shape or a depressed shape, and includes resin, metal, ceramics, or the like having a three-dimensional curved surface. Resins similar to the resins used in the molding described above can be shown by way of example.

Specifically, it is preferable to use a chamber box composed of upper and lower two molding chambers separable from each another.

First, the core material is mounted and set on a table in the lower molding chamber. A laminate according to the present invention which is an object to be molded is fixed to the upper surface of the lower molding chamber by a clamp. In this instance, the upper and lower molding chambers are at atmospheric pressure inside.

Then the upper molding chamber is lowered, the upper and lower molding chambers are joined to each other, and the inside of the chamber box is brought into a closed state. Both of the insides of the upper and lower molding chambers are brought into a vacuum suction state from an atmospheric-pressure state by a vacuum tank.

After the insides of the upper and lower molding chambers are brought into the vacuum suction state, a heater is turned on to heat a decorative sheet. Then the table in the lower molding chamber is raised while the insides of the upper and lower molding chambers are in a vacuum state.

Then the vacuum in the upper molding chamber is released, the atmospheric pressure is brought therein, and the laminate according to the present invention which is an object to be molded is thereby pressed against the core material and overlaid (molded). Note that it is also possible to cause the laminate according to the present invention which is an object to be molded to adhere to the core material with greater force by supplying compressed air into the upper molding chamber.

After the completion of the overlay, the heater is turned off, the vacuum inside the lower molding chamber is also released and brought back to the atmospheric pressure, the upper molding chamber is raised, and a product covered with a decorated and printed laminate as a front cover material is taken out.

The arithmetic average roughness Ra of the surface, from which the second layer is separated, of the molded article obtained by the second method of manufacturing a molded article according to the present invention is preferably 0.50 µm or less, and more preferably 0.40 µm or less.

When the Ra is more than 0.50 µm, the surface is no longer smooth, the glossiness of the surface deteriorates, and there is therefore concern that the designability of the molded article is impaired.

In the second method of manufacturing a molded article according to the present invention, the second layer and the third layer may be separated from the laminate, and a separated layer may be obtained. Thus, the separated layer can be independently obtained.

The separated layer comprises the first layer, the fourth layer and the first layer, the fourth layer and the first layer on which the print layers are formed, the fourth layer and the first layer on which the metal layers are formed, and the like.

Any time of separation can be selected in accordance with processing and the purpose of use, for example, before printing, before the vapor deposition of the metal layer, before preliminary shaping, before injection molding, and before the use of a molded product. The time of separation is preferably before or after the molding of the laminate.

In the second method of manufacturing a molded article according to the present invention, the fourth layer described above may be laminated. The fourth layer may be laminated before or after separation. Alternatively, the fourth layer may be laminated before or after molding.

Polypropylene, or polypropylene and modified polyolefin comprised in the first layer obtained by the first and second methods of manufacturing a molded article according to the present invention preferably comprise smectic crystal.

By calculating a scattered intensity distribution and a long period using small-angle X-ray scattering analysis, it is possible to determine whether or not the first layer of the molded article obtained by the first and second methods of manufacturing a molded article according to the present invention is obtained by cooling at 80° C./sec or more. That is, it is possible to determine by the above analysis whether or not a substrate layer has a microstructure derived from smectic crystal. Measurements can be performed under the following conditions, for example.

ultraX 18HF (manufactured by Rigaku Corporation) is used as an X-ray generator, and an imaging plate is used for the detection of scattering.

Light source wavelength: 0.154 nm
Voltage/current: 50 kV/250 mA
Irradiation time: 60 min
Camera length: 1.085 mm
Sample thickness: The sheets are laid over each other at 1.5 to 2.0 mm. The sheets are laid over each other so that film formation (MD) directions are aligned.

By use of the first and second laminates according to the present invention, a molded article provided with a desired decoration can be manufactured with satisfactory workability. A molded article manufactured by use of the first and second laminates according to the present invention can be used for a component of a computer such as a desktop personal computer or a notebook personal computer, a component of a mobile telephone, electrical and electronic equipment, a portable information terminal, a component of a home electric appliance, a component of an automobile, an industrial material, a building material, and the like.

EXAMPLES

Examples are shown below to more specifically describe the present invention, but the scope of the present invention is not limited to the description in these Examples.

Components used in Examples and Comparative Example are shown below.

Homo-polypropylene (trade name: Prime Polypro (registered trademark) F-133A, manufactured by Prime Polymer Co., Ltd., MFR=3 g/10 minutes (2160 g, 230° C.), an isotactic pentad fraction of 98 mol %)

Maleic acid-modified polypropylene (trade name: Modic (registered trademark) P-604V, manufactured by Mitsubishi Chemical Co., Ltd.)

Polyamide 12 (trade name: UBESTA (registered trademark) 3030XA, manufactured by Ube Industries, Ltd., MFR=2 to 6 g/10 minutes (2160 g, 235° C.))

Low density polyethylene (trade name: R300, manufactured by Ube Maruzen Polyethylene Co., Ltd., density 920 kg/m$^3$)

Ethylene-vinyl alcohol copolymer (trade name: EVAL (registered trademark) E171B, manufactured by Kuraray Co., Ltd., an ethylene copolymerization ratio of 44 mol %)

Ethylene-vinyl acetate copolymer (trade name: Ultrathene (registered trademark) 628, manufactured by Tosoh Corporation, an ethylene copolymer ratio of 80 mol %)

Polystyrene (trade name: G9305, manufactured by PS Japan Co., Ltd., GPPS (general-purpose polystyrene))

Polylactic acid (trade name: REVODE (registered trademark) 110, Zhejiang Hisun Biomaterials Co., Ltd)

Urethane resin (trade name: HYDRAN (registered trademark) WLS-202, manufactured by DIC Co., Ltd.)

Example 1

A laminate sheet composed of two layers was manufactured by the coextrusion method with the use of the manufacturing device shown in FIG. 1, in accordance with manufacturing conditions shown below. Homo-polypropylene (homo-PP) was used as the material of the first layer, and polyamide 12 was used as the material of the second layer. The constitution of each layer is shown in Table 1. It should be noted that the thickness of each layer of the obtained laminate sheet was measured by cross-sectional observation using a phase contrast microscope.

The obtained laminate sheet was transparent.

Layer constitution of laminate sheet: first layer/second layer
  Diameter of extruder of first layer: 75 mm
  Diameter of extruder of second layer: 50 mm
  Width of T-die: 900 mm
  Speed of taking laminate sheet: 6 m/minute
  Surface temperatures of fourth cooling roll and metallic endless belt: 20° C.
  Cooling speed: 12,000° C./minute Example 2

Except that low density polyethylene was used as the material of the second layer, a laminate sheet composed of two layers was manufactured by the coextrusion method in a manner similar to Example 1. The constitution of each layer is shown in Table 1. The obtained laminate sheet was transparent.

Example 3

Except that an ethylene-vinyl alcohol copolymer was used as the material of the second layer, a laminate sheet composed of two layers was manufactured by the coextrusion method in a manner similar to Example 1. The constitution of each layer is shown in Table 1. The obtained laminate sheet was transparent.

Example 4

Except that an ethylene-vinyl acetate copolymer was used as the material of the second layer, a laminate sheet composed of two layers was manufactured by the coextrusion method in a manner similar to Example 1. The constitution of each layer is shown in Table 1. The obtained laminate sheet was transparent.

Example 5

A laminate sheet composed of three layers was manufactured by the coextrusion method with the use of the manufacturing device shown in FIG. 1, in accordance with manufacturing conditions shown below. Homo-polypropylene was used as the material of the first layer, polyamide 12 was used as the material of the second layer, and homo-polypropylene was used as the material of the third layer. The constitution of each layer is shown in Table 1. The obtained laminate sheet was transparent.

Layer constitution of laminate sheet: first layer/second layer/third layer
  Diameter of extruder of first layer: 75 mm
  Diameter of extruder of second layer: 50 mm
  Diameter of extruder of third layer: 65 mm
  Width of T-die: 900 mm
  Speed of taking laminate sheet: 6 m/minute
  Surface temperatures of fourth cooling roll and metallic endless belt: 20° C.
  Cooling speed: 12,000° C./minute Example 6

Except that a mixed resin comprising 80 mass percent of homo-polypropylene and 20 mass percent of maleic acid-modified polypropylene was used as the material of the first layer, and a mixed resin comprising 65 mass percent of homo-polypropylene and 35 mass percent of maleic acid-modified polypropylene was used as the material of the third layer, a laminate sheet composed of three layers was manufactured by the coextrusion method in a manner similar to Example 5. The constitution of each layer is shown in Table 1. The obtained laminate sheet was transparent.

Example 7

Regarding the two-layer laminate sheet manufactured in Example 1, the surface of the first layer opposite to the surface with which the second layer is in contact was subjected to a corona treatment, and then coated with 0.23 g/m$^2$ of a urethane resin by use of a bar coater. A fourth layer was formed by drying the urethane resin for 1 minute at 80° C., and a laminate sheet composed of three layers was manufactured. The constitution of each layer is shown in Table 1. The obtained laminate sheet was transparent.

Layer constitution of laminate sheet: fourth layer/first layer/second layer

Example 8

Except that the three-layer laminate sheet manufactured in Example 5 was used, a fourth layer was formed in a manner similar to Example 7, and a laminate sheet composed of four layers was manufactured. The constitution of each layer is shown in Table 1. The obtained laminate sheet was transparent.

Layer constitution of laminate sheet: fourth layer/first layer/second layer/third layer Example 9

Except that the three-layer laminate sheet manufactured in Example 6 was used, a fourth layer was formed in a manner similar to Example 7, and a laminate sheet composed of four layers was manufactured. The constitution of each layer is shown in Table 1. The obtained laminate sheet was transparent.

Layer constitution of laminate sheet: fourth layer/first layer/second layer/third layer.

Reference Example 1

Except that the thickness of the first layer was 50 μm, a laminate sheet composed of two layers was manufactured by the coextrusion method in a manner similar to Example 1. The constitution of each layer is shown in Table 1. The obtained laminate sheet was transparent.

Comparative Example 2

Except that polystyrene was used as the material of the second layer, a laminate sheet composed of two layers was manufactured by the coextrusion method in a manner similar to Example 1. The constitution of each layer is shown in Table 1. The obtained laminate sheet was transparent.

Comparative Example 3

Except that a polylactic acid was used as the material of the second layer, a laminate sheet composed of two layers was obtained in a manner similar to Example 1. The constitution of each layer is shown in Table 1. The obtained laminate sheet was transparent.

[Elongation at Break of Fourth Layer]

The tensile elongation at break of the fourth layer of the manufactured laminate was measured with a sample having a thickness 150 μm by a method compliant with JIS K7311.

[Softening Temperature of Fourth Layer]

The softening temperature of the fourth layer of the manufactured laminate was measured. Specifically, the flow start temperature was measured by a Koka flow tester.

[Measurement of Surface Roughness]

The surface roughness of the manufactured laminate sheet (laminate) and the molded article manufactured by use of the laminate sheet was measured. Specifically, for the laminate sheet, the arithmetic average roughness Ra of the side of the first layer contacting the second layer was measured regarding the layer from which the second layer is separated. The molded article was manufactured by insert molding after the second layer was separated from the laminate sheet, and the arithmetic average roughness Ra of the side of the first layer, which is a surface of the molded article, contacting the second layer was measured.

A measuring device and measuring conditions are shown below.

Measuring device: 3D measurement laser microscope (LEXT4000LS) manufactured by Olympus Corporation Measurement Setting Objective lens: 20 power Zoom: 1 power Measurement pitch: 0.06 μm Operation Mode: X, Y, Z high-precision color Measurement area: surface (peeling surface of the first layer)

Measurement quality: high precision

Analysis length: 642 μm

[Evaluation of the Workability of Laminate Sheet]

1. Warp of Laminate

The manufactured laminate sheet was cut at a length of 1 m in a flow direction (in FIG. 1, a direction indicated by an arrow in which the laminate sheet 11 is taken), and put in a flat place so that the upwardly warped end was turned up, and the upward warp amount of the end was measured with a metal scale. The case where the upward warp amount was 10 mm or less was evaluated as O, and the case where the upward warp amount was more than 10 mm was evaluated as X. The results are shown in Table 1.

2. Workability at Printing

Workability during the printing of the manufactured laminate sheet was evaluated. Specifically, when the manufactured laminate sheet was put in a leaf dryer at 90° C. and heated for one hour, the case where there was no occurrence of a defect such as falling from a rack or the breaking of the sheet was evaluated as O, and the case where a defect occurred was evaluated as X. The results are shown in Table 1.

3. Workability During Manufacture of Molded Article

Workability during the manufacture of a molded article by injection molding using the manufactured laminate sheet was evaluated. Specifically, the second layer (and the third layer) was separated (peeled) from the manufactured laminate sheet and then attached to a die, and a resin for molded articles was supplied to integrally mold a molded article.

The case where there was no occurrence of a defect such as bending resulting from insufficient rigidity or falling, or wrinkles in the surface of the molded article during injection molding when the laminate sheet was set in a die of injection molding was evaluated as O. The case where a defect occurred was evaluated as X. The results are shown in Table 1.

TABLE 1

| | Layer constitution of laminate sheet | Example 1 | Example 2 | Example 3 | Example 4 | Example 5 | Example 6 |
|---|---|---|---|---|---|---|---|
| First layer | Material | Homo-PP | Homo-PP | Homo-PP | Homo-PP | Homo-PP | Homo-PP + maleic acid-modified PP |
| | Thickness (μm) | 180 | 180 | 180 | 180 | 100 | 100 |
| Second layer | Material | Polyamide 12 | Low density polyethylene | Ethylene-vinyl alcohol copolymer | Ethylene-vinyl acetate copolymer | Polyamide 12 | Polyamide 12 |

TABLE 1-continued

| | | | | | | | |
|---|---|---|---|---|---|---|---|
| Third layer | Thickness (μm) | 20 | 20 | 20 | 20 | 5 | 5 |
| | Material | — | — | — | — | Homo-PP | Homo-PP + maleic acid-modified PP |
| | Thickness (μm) | — | — | — | — | 100 | 100 |
| Fourth layer | Material | — | — | — | — | — | — |
| | Thickness (nm) | — | — | — | — | — | — |
| | Elongation at break (%) | — | — | — | — | — | — |
| | Softening temperature (° C.) | — | — | — | — | — | — |
| Arithmetic average roughness Ra (μm) | Laminate | 0.012 | 0.250 | 0.015 | 0.036 | 0.023 | 0.035 |
| | Molded article | 0.009 | 0.200 | 0.012 | 0.033 | 0.021 | 0.029 |
| Workability | Warp of laminate | ○ | ○ | ○ | ○ | ○ | ○ |
| | At printing | ○ | ○ | ○ | ○ | ○ | ○ |
| | During manufacture of molded article | ○ | ○ | ○ | ○ | ○ | ○ |

| Layer constitution of laminate sheet | | Example 7 | Example 8 | Example 9 | Reference Example 1 | Comparative Example 2 | Comparative Example 3 |
|---|---|---|---|---|---|---|---|
| First layer | Material | Homo-PP | Homo-PP | Homo-PP + maleic acid-modified PP | Homo-PP | Homo-PP | Homo-PP |
| | Thickness (μm) | 180 | 100 | 100 | 50 | 180 | 180 |
| Second layer | Material | Polyamide 12 | Polyamide 12 | Polyamide 12 | Polyamide 12 | Polystyrene | Polylactic acid |
| | Thickness (μm) | 20 | 5 | 5 | 20 | 20 | 20 |
| Third layer | Material | — | Homo-PP | Homo-PP + maleic acid-modified PP | — | — | — |
| | Thickness (μm) | — | 100 | 100 | — | — | — |
| Fourth layer | Material | Urethane resin | Urethane resin | Urethane resin | — | — | — |
| | Thickness (nm) | 230 | 230 | 230 | — | — | — |
| | Elongation at break (%) | 600 | 600 | 600 | — | — | — |
| | Softening temperature (° C.) | 160 | 160 | 160 | — | — | — |
| Arithmetic average roughness Ra (μm) | Laminate | 0.012 | 0.022 | 0.041 | 0.021 | 0.009 | 0.010 |
| | Molded article | 0.010 | 0.022 | 0.031 | 0.022 | 0.010 | 0.011 |
| Workability | Warp of laminate | ○ | ○ | ○ | ○ | × | × |
| | At printing | ○ | ○ | ○ | × | × | × |
| | During manufacture of molded article | ○ | ○ | ○ | × | × | × |

Example 10

The manufacturing device shown in FIG. 1 was used.

80 weight percent of polypropylene (Prime Polypro F-133A, manufactured by Prime Polymer Co., Ltd., (a melt flow index of 3 g/10 minutes, homo-polypropylene), an isotactic pentad fraction of 98 mol %), and 20 weight percent of modified polyolefin (Modic P-604V manufactured by Mitsubishi Chemical Corporation (a melt flow index of 3.2 g/10 minutes, maleic acid-modified polypropylene) were put into the extruder for the first layer.

Polyamide 12 (UBESTA3030XA, manufactured by Ube Industries, Ltd. (a melt flow index of 2 to 6 g/min)) was put into the extruder for the second layer.

65 weight percent of polypropylene described above and 35 weight percent of modified polyolefin described above were put into an extruder for the third layer.

A laminate was obtained as a result of extrusion under the following conditions simultaneous with kneading.
Diameter of extruder of first layer: 75 mm
Diameter of extruder of second layer: 50 mm
Diameter of extruder of third layer: 65 mm
Width of T-die 12: 900 mm
Constitution of lamination device: first layer/second layer/third layer Speed of taking sheet 11: 6 m/minute
Surface temperatures of fourth cooling roll 16 and metallic endless belt 17: 20° C.
Cooling speed: 12,000° C./minute The melt flow index was measured in compliance with JIS-K7210.

The thickness of each layer of the obtained laminate was measured by cross-sectional observation using a phase contrast microscope. The results are shown in Table 2.

The obtained laminate was subjected to a peeling interface test. The laminate was cut into a 10 cm square, and peeled by hand. This action was repeated 10 times.

The case where the laminate was peeled at the interface between the first layer and the second layer in every instance was ranked A.

The case where the laminate was peeled at the interface between the third layer and the second layer one or more times, or the case where the laminate was simultaneously peeled at the interface between the first layer and the second layer and at the interface between the second layer and the third layer was ranked B.

The case where the laminate was peeled at the interface between the second layer and the third layer in every instance was ranked C.

The results are shown in Table 2.

The laminate was peeled in the first layer and the second layer, and the arithmetic average roughness Ra of the peeled surface of the first layer was found by a 3D laser microscope LEXT4000LS (manufactured by Olympus Corporation) under the following conditions.

Further, regarding the molded article described later, the arithmetic average roughness Ra of the peeled surface of the first layer was measured in a similar manner.

The results are shown in Table 1.
Objective lens: 20 power
Zoom: 1 power
Measurement pitch: 0.06 μm
Scan mode: X, Y, Z high-precision color
Measurement area: surface
Measurement quality: high precision
Analysis Length: 642 μm As the evaluation of workability, a warp of the laminate, handling at printing, and the appearance of the molded article were evaluated.

A warp of the obtained laminate was measured.

The laminate was cut at a length of 1 m in a flow direction (in FIG. 1, the direction indicated by the arrow in which the laminate sheet 11 is taken), and put in a flat place so that the upwardly warped end was turned up, and the upward warp amount of the end was measured with a metal scale. The case where the upward warp amount was 10 mm or less was evaluated as O, and the case where the upward warp amount was more than 10 mm was evaluated as X. The results are shown in Table 2.

Handling of the obtained laminate at printing was evaluated.

When the laminate was put in a leaf dryer at 90° C. and heated for one hour, the case where there was no occurrence of a defect such as falling from a rack or the breaking of the sheet was evaluated as O, and the case where a defect occurred was evaluated as X. The results are shown in Table 2.

The second layer and the third layer were separated from the obtained laminate, the separated layers were molded by insert molding, and a molded article was obtained.

The appearance of the obtained molded article was evaluated.

The case where there was no occurrence of a defect such as bending resulting from insufficient rigidity or falling during setting in a die of injection molding, or wrinkles during injection molding was evaluated as O, and the case where a defect occurred was evaluated as X. The results are shown in Table 2.

Example 11

Except that polyamide 12 was changed to an ethylene-vinyl alcohol copolymer (Eval E171B, manufactured by Kuraray Co., Ltd., an ethylene copolymerization ratio of 44 mol %) in the extruder for the second layer, a laminate and a molded article were manufactured in a manner similar to Example 10, and evaluated. The results are shown in Table 2.

Example 12

Except that polyamide 12 was changed to an ethylene-vinyl acetate copolymer (Ultrathene628, manufactured by Tosoh Corporation, an ethylene copolymer ratio of 80 mol %) in the extruder for the second layer, a laminate and a molded article were manufactured in a manner similar to Example 10, and evaluated. The results are shown in Table 2.

Example 13

In a manner similar to Example 10, the first layer, the second layer, and the third layer were laminated by the manufacturing device shown in FIG. 1, the surface of the first layer with which the second layer is not in contact was subjected to a corona treatment and coated with 0.23 g/m² of a urethane resin (HYDRAN WLS-202, manufactured by DIC Co., Ltd.) by use of a bar coater, a fourth layer was formed by drying for one minute at 80° C., and a laminate was obtained. Except for the above, a laminate and a molded article were manufactured in a manner similar to Example 10, and evaluated. The results are shown in Table 2.

The thickness of the fourth layer was measured in a manner similar to Example 10. The results are shown in Table 2.

The tensile elongation at break of the fourth layer was measured by a method compliant with JIS K7311 in the following manner; a glass substrate was coated with 0.23 g/m² of the urethane resin described above by a bar coater, and the urethane resin was dried for one minute at 80° C. and then separated to create a sample having a thickness of 150 μm. The results are shown in Table 2.

In a manner similar to the above, the created sample was used to find the softening temperature of the fourth layer by measuring the flow start temperature with a Koka flow tester. The results are shown in Table 2.

Example 14

Except that polyamide 12 was changed to an ethylene-vinyl alcohol copolymer in the extruder for the second layer, a laminate and a molded article were manufactured in a manner similar to Example 13, and evaluated. The results are shown in Table 2.

Example 15

Except that polyamide 12 was changed to an ethylene-vinyl acetate copolymer in the extruder for the second layer, a laminate and a molded article were manufactured in a manner similar to Example 13, and evaluated. The results are shown in Table 2.

Comparative Example 4

Except that polypropylene was only used without the use of modified polyolefin in the extruder for the first layer and the extruder for the third layer, a laminate and a molded article were manufactured in a manner similar to Example 10, and evaluated. The results are shown in Table 2.

Comparative Example 5

Except that polyamide 12 was changed to polystyrene (G9305, manufactured by PS Japan Co., Ltd., GPPS (general-purpose polystyrene)) in the extruder for the second layer, a laminate and a molded article were manufactured in a manner similar to Example 10, and evaluated. The results are shown in Table 2.

Comparative Example 6

Except that polyamide 12 was changed to polylactic acid (REVODE 110, manufactured by Zhejiang Hisun Biomaterials Co., Ltd) in the extruder for the second layer, a laminate and a molded article were manufactured in a manner similar to Example 10, and evaluated. The results are shown in Table 2.

TABLE 2

|  |  | Example 10 | Example 11 | Example 12 | Example 13 | Example 14 | Example 15 | Comparative Example 4 | Comparative Example 5 | Comparative Example 6 |
|---|---|---|---|---|---|---|---|---|---|---|
| Mixture for first layer | Polypropylene (wt %) | 80 | 80 | 80 | 80 | 80 | 80 | 100 | 80 | 80 |
|  | Modified polyolefin (wt %) | 20 | 20 | 20 | 20 | 20 | 20 | — | 20 | 20 |
|  | Thickness of first layer (μm) | 100 | 100 | 100 | 100 | 100 | 100 | 100 | 100 | 100 |
| Second layer | Resin for second layer | Polyamide 12 | Ethylene-vinyl alcohol copolymer | Ethylene-vinyl acetate copolymer | Polyamide 12 | Ethylene-vinyl alcohol copolymer | Ethylene-vinyl acetate copolymer | Polyamide 12 | Polystyrene (GPPS) | Polylactic acid |
|  | Thickness (μm) | 5 | 20 | 20 | 5 | 20 | 20 | 5 | 20 | 20 |
| Mixture for third layer | Polypropylene (wt %) | 65 | 65 | 65 | 65 | 65 | 65 | 100 | 65 | 65 |
|  | Modified polyolefin (wt %) | 35 | 35 | 35 | 35 | 35 | 35 | — | 35 | 35 |
|  | Thickness of third layer (μm) | 100 | 80 | 80 | 100 | 80 | 80 | 100 | 80 | 80 |
| Fourth layer | Resin for fourth layer | — | — | — | Urethane resin | Urethane resin | Urethane resin | — | — | — |
|  | Thickness (nm) | — | — | — | 230 | 230 | 230 | — | — | — |
|  | Elongation at break (%) | — | — | — | 600 | 600 | 600 | — | — | — |
|  | Softening temperature (° C.) | — | — | — | 160 | 160 | 160 | — | — | — |
|  | Peeling interface | A | A | A | A | A | A | B | B | A |
| Arithmetic average roughness Ra (μm) | Laminate | 0.018 | 0.020 | 0.032 | 0.021 | 0.042 | 0.025 | 0.013 | 0.010 | 0.021 |
|  | Molded article | 0.020 | 0.012 | 0.023 | 0.022 | 0.033 | 0.022 | 0.011 | 0.007 | 0.011 |
| Workability | Warp of laminate | ○ | ○ | ○ | ○ | ○ | ○ | ○ | x | x |
|  | Handling at printing | ○ | ○ | ○ | ○ | ○ | ○ | x | x | x |
|  | Appearance of molded article | ○ | ○ | ○ | ○ | ○ | ○ | x | x | x |

While some of the embodiments and/or examples of the present invention have been described above in detail, those skilled in the art can easily make numerous modifications to these exemplary embodiments and/or examples substantially without departing from the novel teachings and advantages of the present invention. Therefore, these numerous modifications fall within the scope of the present invention.

The description of Japanese patent application on which Paris convention priority of the present application is claimed is incorporated herein by reference in its entirety.

The invention claimed is:

1. A laminate comprising:
   a first layer comprising polypropylene;
   a second layer comprising one or more selected from the group consisting of polyethylene, polyamide 66, polyamide 6, polyamide 1010, polyamide 12, polyamide 11, an ethylene-vinyl alcohol copolymer, and an ethylene-vinyl acetate copolymer; and
   a third layer comprising polypropylene,
   wherein a thickness of the first layer is 60 μm to 250 μm,
   the first layer and the second layer are in direct contact, and
   the third layer is in direct contact with the surface of the second layer with which the first layer is not in direct contact.

2. The laminate according to claim 1, which further comprises a fourth layer comprising one or more selected from the group consisting of a urethane resin, an acrylic resin, polyolefin, and polyester,
   wherein the fourth layer is in contact with the surface of the first layer with which the second layer is not in contact.

3. The laminate according to claim 2, wherein the fourth layer is formed from a plurality of layers.

4. The laminate according to claim 2, wherein when a thickness of the fourth layer is 150 μm, a tensile elongation at break of this layer is 150% to 900%, and a softening temperature of the fourth layer is 50° C. to 180° C.

5. The laminate according to claim 2, wherein the surface of the fourth layer with which the first layer is not in contact is printed.

6. The laminate according to claim 2, wherein a layer comprising a metal or a metal oxide is formed on the surface of the fourth layer with which the first layer is not in contact.

7. The laminate according to claim 1, wherein an arithmetic average roughness Ra of the side of the first layer contacting the second layer when the second layer is separated from the laminate is 0.50 μm or less.

8. The laminate according to claim 1, wherein a crystallization speed of polypropylene in the first layer at 130° C. is 2.5 $min^{-1}$ or less.

9. The laminate according to claim 1, wherein an isotactic pentad fraction of polypropylene in the first layer is 80 mol % or more and 99 mol % or less.

10. A laminate comprising:
    a first layer comprising polypropylene, or polypropylene and modified polyolefin;
    a second layer comprising one or more resins selected from the group consisting of polyethylene, polyamide 66, polyamide 6, polyamide 1010, polyamide 12, polyamide 11, an ethylene-vinyl alcohol copolymer, and an ethylene-vinyl acetate copolymer; and
    a third layer comprising modified polyolefin and one or more resins selected from the group consisting of polypropylene and polyethylene,
    wherein the first layer and the second layer are in direct contact,
    the third layer is in contact with the surface of the second layer with which the first layer is not in direct contact, and
    a ratio of the modified polyolefin to 100 weight percent of one or more resins selected from the group consisting of polypropylene and polyethylene, and modified polyolefin in the third layer is larger than a ratio of the modified polyolefin to 100 weight percent of polypropylene, or polypropylene and modified polyolefin in the first layer.

11. The laminate according to claim 10, wherein a modification amount of a mixture of one or more resins selected from the group consisting of polypropylene and polyethylene, and modified polyolefin in the third layer is greater than the modification amount of polypropylene, or a mixture of polypropylene and modified polyolefin in the first layer.

12. The laminate according to claim 10, wherein the modified polyolefin in the third layer is the same as the modified polyolefin in the first layer.

13. The laminate according to claim 10, wherein an arithmetic average roughness Ra of the interface of the first layer relative to the second layer is 0.50 µm or less.

14. The laminate according to claim 10, wherein a crystal structure of polypropylene, or polypropylene and modified polyolefin in the first layer comprises smectic crystal.

15. The laminate according to claim 10, wherein a crystallization speed of polypropylene, or polypropylene and modified polyolefin in the first layer at 130° C. is 2.5 min$^{-1}$ or less.

16. The laminate according to claim 10, wherein an isotactic pentad fraction of polypropylene, or polypropylene and modified polyolefin in the first layer is 80 mol % or more and 99 mol % or less.

17. The laminate according to claim 10, wherein one or more fourth layers each comprising one or more resins selected from the group consisting of a urethane resin, an acrylic resin, polyolefin, and polyester are laminated on the surface of the first layer with which the second layer is not in contact.

18. The laminate according to claim 17, wherein when a thickness of the fourth layer is 150 µm, a tensile elongation at break of the fourth layer is 150% or more and 900% or less, and
a softening temperature of the fourth layer is 50° C. or higher and 180° C. or lower.

19. The laminate according to claim 17, wherein a print layer is present on the surface of the fourth layer with which the first layer is not in contact.

20. The laminate according to claim 17, wherein a layer comprising a metal or a metal oxide is formed on the surface of the fourth layer with which the first layer is not in contact.

21. The laminate according to claim 10, being separable at an interface between the first layer and the second layer.

22. A method of manufacturing a molded article, which comprises:
(a) a step of manufacturing the molded article comprising the laminate of claim 1.

23. The method of manufacturing the molded article according to claim 22, which further comprises:
(b) a step of separating the second layer and the third layer from the laminate.

24. The method of manufacturing the molded article according to claim 22, wherein in the step (a), the laminate is attached to a die, and a resin for molded articles is supplied to integrate the laminate with the resin for molded articles.

25. The method of manufacturing the molded article according to claim 22, wherein in the step (a), the laminate is shaped in conformity to a die, the shaped laminate is attached to the die, and a resin for molded articles is supplied to integrate the laminate with the resin for molded articles.

26. The method of manufacturing the molded article according to claim 22, wherein in the step (a),
a core material is provided in a chamber box,
the laminate is disposed above the core material,
the inside of the chamber box is decompressed,
the laminate is heated and softened, and
the heated and softened laminate is pressed on the core material to cover the core material.

27. The method of manufacturing the molded article according to claim 23, wherein the step (b) is conducted before or after the step (a).

28. The method of manufacturing the molded article according to claim 22, which further comprises, before the step (a):
(c) a step of forming a fourth layer comprising one or more selected from the group consisting of a urethane resin, an acrylic resin, polyolefin, and polyester on the surface of the first layer with which the second layer is not in contact.

29. The method of manufacturing the molded article according to claim 28, which further comprises, after the step (c):
(d) a step of printing the surface of the fourth layer with which the first layer is not in contact, followed by conducting the step (a) or the step (b).

30. The method of manufacturing the molded article according to claim 28, which further comprises, after the step (c):
(e) a step of forming a layer comprising a metal or a metal oxide on the surface of the fourth layer with which the first layer is not in contact, followed by conducting the step (a) or the step (b).

31. The method of manufacturing the molded article according to claim 22, wherein when the second layer is separated, an arithmetic average roughness Ra of the side of the first layer contacting the second layer is 0.50 µm or less.

32. The method of manufacturing the molded article according to claim 22, wherein a crystallization speed of the polypropylene in the first layer at 130° C. is 2.5 min' or less.

33. The method of manufacturing the molded article according to claim 22, wherein an isotactic pentad fraction of the polypropylene in the first layer is 80 mol % or more and 99 mol % or less.

34. A method of manufacturing the laminate of claim 10, which comprises: heating and melting polypropylene, or a mixture of polypropylene and modified polyolefin for a first layer, one or more resins selected from the group consisting of polyethylene, polyamide 66, polyamide 6, polyamide 1010, polyamide 12, polyamide 11, an ethylene-vinyl alcohol copolymer, and an ethylene-vinyl acetate copolymer for a second layer, and a mixture of modified polyolefin and one or more resins selected from the group consisting of polypropylene and polyethylene for a third layer; and forming and cooling the first layer, the second layer, and the third layer; thereby obtaining the laminate.

35. The method of manufacturing the laminate according to claim 34, wherein after the cooling,
one or more fourth layers each comprising one or more resins selected from the group consisting of a urethane resin, an acrylic resin, polyolefin, and polyester are laminated on the surface of the first layer with which the second layer is not in contact.

36. The method of manufacturing the laminate according to claim 35, which further comprises a step of printing the surface of the fourth layer with which the first layer is not in contact.

37. The method of manufacturing the laminate according to claim 35, which further comprises a step of forming a layer comprising a metal or a metal oxide on the surface of the fourth layer with which the first layer is not in contact.

38. A method of manufacturing a molded article, which comprises molding the laminate according to claim 10 to obtain the molded article.

39. The method of manufacturing the molded article according to claim 38, wherein the molding is conducted by attaching the laminate to a die, and supplying a resin for molding to integrate the laminate with the resin for molding.

40. The method of manufacturing the molded article according to claim 38, wherein the molding is conducted by shaping the laminate in conformity to a die, attaching the shaped laminate to the die, and supplying a resin for molding to integrate the laminate with the resin for molding.

41. The method of manufacturing the molded article according to claim 38, wherein the molding comprises:
providing a core material in a chamber box;
disposing the laminate above the core material;
decompressing the inside of the chamber box;
heating and softening the laminate; and
pressing the heated and softened laminate on the core material to cover the core material.

42. The method of manufacturing the molded article according to claim 38, which further comprises separating the second layer and the third layer from the laminate to obtain a separated layer.

43. The method of manufacturing the molded article according to claim 38, which further comprises, before the molding, separating the second layer and the third layer from the laminate to obtain a separated layer.

44. The method of manufacturing the molded article according to claim 38, which further comprises, after the molding, separating the second layer and the third layer from the laminate to obtain a separated layer.

45. The method of manufacturing the molded article according to claim 42, which further comprises, before the separating, laminating one or more fourth layers each comprising one or more resins selected from the group consisting of a urethane resin, an acrylic resin, polyolefin, and polyester on the surface of the first layer with which the second layer is not in contact.

46. The method of manufacturing the molded article according to claim 42, which further comprises, after the separating, laminating one or more fourth layers each comprising one or more resins selected from the group consisting of a urethane resin, an acrylic resin, polyolefin, and polyester on the surface of the first layer opposite to the surface from which the second layer is separated.

47. The method of manufacturing the molded article according to claim 45, which further comprises a step of printing the surface of the fourth layer with which the first layer is not in contact.

48. The method of manufacturing the molded article according to claim 45, which further comprises a step of forming a layer comprising a metal or a metal oxide on the surface of the fourth layer with which the first layer is not in contact.

49. The method of manufacturing the molded article according to claim 38, wherein an arithmetic average roughness Ra of the surface of the molded article from which the second layer is separated is 0.50 µm or less.

50. The method of manufacturing the molded article according to claim 38, wherein a crystallization speed of polypropylene, or polypropylene and modified polyolefin in the first layer at 130° C. is 2.5 min' or less.

51. The method of manufacturing the molded article according to claim 38, wherein an isotactic pentad fraction of polypropylene, or polypropylene and modified polyolefin in the first layer is 80 mol % or more and 99 mol % or less.

* * * * *